United States Patent
Iwai

(10) Patent No.: US 9,485,393 B2
(45) Date of Patent: Nov. 1, 2016

(54) IMAGING DEVICE INCLUDING DETECTION UNIT HAVING A LIGHT RECEIVING PLANE

(75) Inventor: Hidenao Iwai, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 99 days.

(21) Appl. No.: 14/113,913

(22) PCT Filed: Apr. 25, 2012

(86) PCT No.: PCT/JP2012/061112
§ 371 (c)(1),
(2), (4) Date: Nov. 19, 2013

(87) PCT Pub. No.: WO2012/147804
PCT Pub. Date: Nov. 1, 2012

(65) Prior Publication Data
US 2014/0078352 A1 Mar. 20, 2014

(30) Foreign Application Priority Data
Apr. 25, 2011 (JP) ................. P2011-097341

(51) Int. Cl.
*H04N 5/217* (2011.01)
*G01T 1/00* (2006.01)
(Continued)

(52) U.S. Cl.
CPC .......... *H04N 5/217* (2013.01); *H04N 5/23229* (2013.01); *H04N 5/2256* (2013.01); *H04N 5/23267* (2013.01)

(58) Field of Classification Search
CPC ................. H04N 5/217; G02B 27/58
USPC .......................................... 348/241
See application file for complete search history.

(56) References Cited

U.S. PATENT DOCUMENTS

| 6,590,979 B1* | 7/2003 | Ryan | H04N 7/1675 348/E7.056 |
|---|---|---|---|
| 2002/0001759 A1* | 1/2002 | Ohashi | G01N 21/956 430/5 |

(Continued)

FOREIGN PATENT DOCUMENTS

| EP | 2 296 031 | 3/2011 |
|---|---|---|
| JP | H4-336776 | 11/1992 |
| JP | 2001-197355 | 7/2001 |
| JP | 2004-506919 | 3/2004 |
| JP | 2005-354157 | 12/2005 |
| JP | 2006-050343 | 2/2006 |
| JP | 2008-199140 | 8/2008 |
| JP | 4452825 | 4/2010 |

OTHER PUBLICATIONS

Golay, M.J.E., "Complementary Series," IRE Transactions on Information Theory, 1961, pp. 82-87.
(Continued)

*Primary Examiner* — Joel Fosselman
(74) *Attorney, Agent, or Firm* — Drinker Biddle & Reath LLP

(57) ABSTRACT

An imaging device includes an illumination unit that irradiates a moving object with light A, an optical system that focuses into an image of the object, a detection unit having a light receiving plane on which the image of the object by this optical system is formed, and an analysis unit. The detection unit includes a plurality of light receiving cells $d_1$ to $d_N$ which are arrayed in an x direction on the light receiving plane, and is disposed such that the image moves in a y direction on the light receiving plane, the detection unit receives light or does not receive light according to pseudo noise code sequences along the y direction respectively on the plurality of light receiving cells.

16 Claims, 37 Drawing Sheets

(51) Int. Cl.
*H04N 5/232* (2006.01)
*H04N 5/225* (2006.01)

(56) References Cited

U.S. PATENT DOCUMENTS

2006/0157640 A1* 7/2006 Perlman et al. ............ 250/208.1
2011/0062335 A1* 3/2011 Franklin .................... 250/338.1

OTHER PUBLICATIONS

Naoki, S., et al., "Modulatable Orthogonal Sequences and Their Application to SSMA Systems," IEEE Transactions on Information Theory, vol. 34, 1998, pp. 93-100.

Habuchi, Hiromasa, "Pseudo-Noise Sequences Based on M-Sequence and Its Application for Communications," Fundamentals Review, vol. 3, No. 1, 2009, pp. 32-42, with attached partial English-language translation.

Oron, Dan, et al., "Scanningless Depth-Resolved Microscopy," Optics Express, vol. 13, 2005, p. 1468.

Aoshima, Nobuharu, "Personal Computer Based Signal Compression Method Applied for a Measurement of Sound Field in a Pipe," Acoustical Science and Technology, vol. 40, No. 3, 1984, pp. 146-151, with attached partial English-language translation.

Duarte, M. F., et al., "Single-Pixel Imagining via Compressive Sampling," IEEE Signal Processing Magazine, IEEE Service Center, Piscataway, N.J., vol. 25, No. 2, Mar. 1, 2008, pp. 83-91.

Neifeld, M., et al., "Optical Architectures for Compressive Imaging," Applied Optics, Optical Society of America, Washington, D.C., U.S., vol. 46, No. 22, Aug. 1, 2007, pp. 5293-5303.

* cited by examiner

Fig.6
(a)
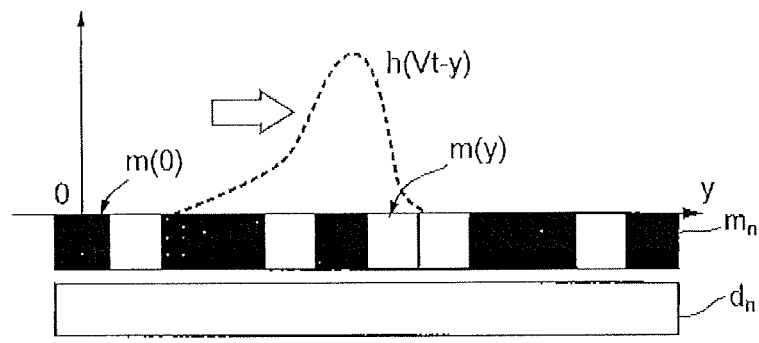
(b)
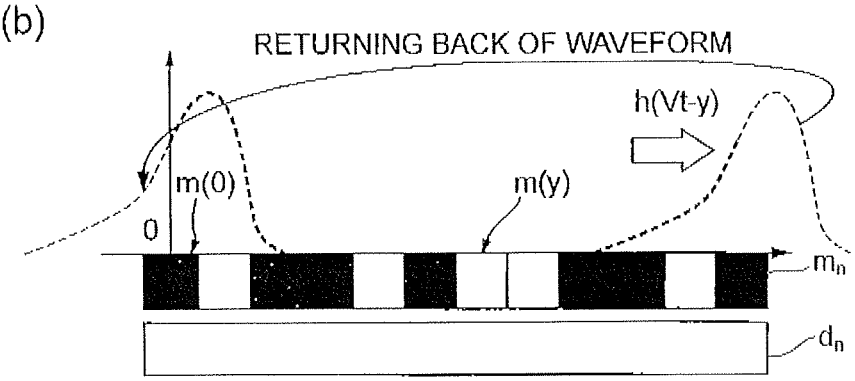

Fig. 34
(a)
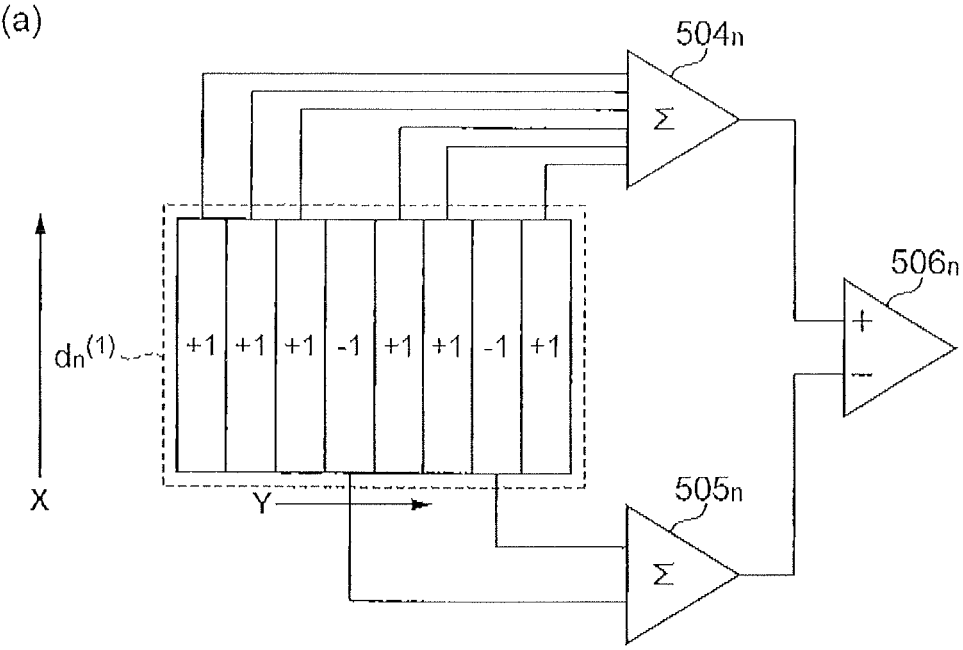
(b)
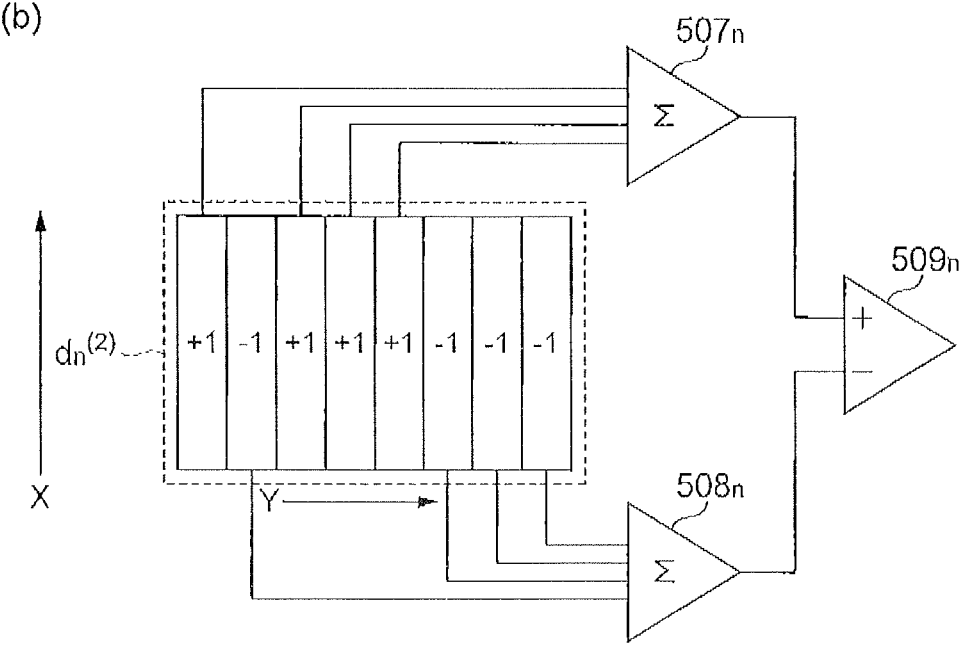

*Fig.36*
(a)            (b)
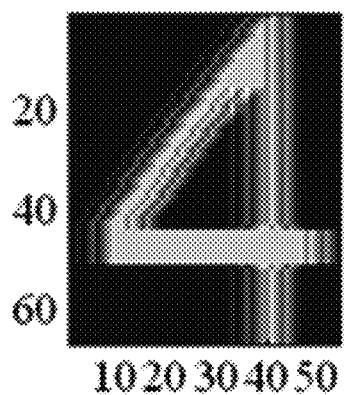 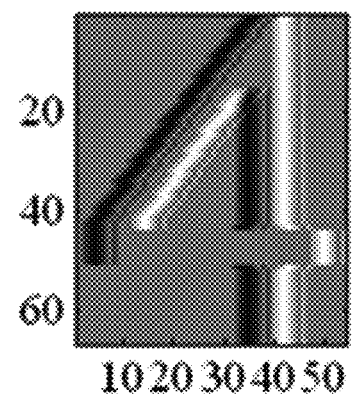

IMAGING DEVICE INCLUDING DETECTION UNIT HAVING A LIGHT RECEIVING PLANE

TECHNICAL FIELD

The present invention relates to an imaging device that takes an image of a moving object.

BACKGROUND ART

A device described in Patent Document 1 has been known as a device that takes an image of a moving object. In this imaging device, pseudo noise code sequence signals are generated in time series, and when the pseudo noise code sequences are specific values, an object is irradiated with light from a light source, and images of the object are taken by a detection unit, to obtain an image into which the images of the object during the respective periods in which the pseudo noise code sequences are specific values are multiplexed. Or, pseudo noise code sequence signals are generated in time series, and when the pseudo noise code sequences are specific values, images of the object are taken by a detection unit, to obtain an image into which the images of the object during the respective periods in which the pseudo noise code sequences are specific values are multiplexed. Then, the image is analyzed, thereby obtaining an image of the moving object as a still image (an image without motion blur).

CITATION LIST

Patent Literature

Patent Document 1: Japanese Published Examined Patent Application No. 4452825

SUMMARY OF INVENTION

Technical Problem

It is necessary for an imaging device described in Patent Document 1 to obtain a two-dimensional image by use of a detection unit in which a plurality of pixels are two-dimensionally arrayed. Further, the faster the moving velocity of an object is, the more necessary it becomes to shorten the respective periods in which the pseudo noise code sequences are specific values by generating pseudo noise code sequences which are modulated to high velocity, and the more necessary it becomes to obtain clear two-dimensional images in the respective periods in which the pseudo noise code sequences are specific values. Accordingly, in this imaging device, in order to obtain an image of a moving object as a still image, there is a limitation of moving velocity of the object.

The present invention has been achieved in order to solve the above-described problem. An object of the present invention is to provide an imaging device which is capable of obtaining an image of the object as a still image even in the case where an object is moving at a high velocity.

Solution to Problem

An imaging device according to an embodiment includes an illumination unit that irradiates a moving object with light, a detection unit having a light receiving plane on which an image of the object irradiated with the light by the illumination unit is formed, and an analysis unit which analyzes a detected result by the detection unit, to obtain an image of the object. Further, in the imaging device according to the embodiment, the detection unit includes a plurality of light receiving cells which are arrayed in a first direction on the light receiving plane, and is disposed such that the image moves in a second direction perpendicular to the first direction on the light receiving plane, the detection unit receives light or does not receive light according to pseudo noise code sequences along the second direction respectively on the plurality of light receiving cells, to output electric signals corresponding to the respective amounts of light received on the plurality of light receiving cells. The analysis unit analyzes the electric signals output respectively from the plurality of light receiving cells of the detection unit, to obtain an image of the object.

An imaging device according to another embodiment includes an illumination unit that irradiates a moving object with light, a detection unit having a light receiving plane on which an image of the object irradiated with the light by the illumination unit is formed, and an analysis unit which analyzes a detected result by the detection unit, to obtain an image of the object. Further, in the imaging device according to the embodiment, the detection unit includes a plurality of light receiving regions which are arrayed in a first direction on the light receiving plane, and is disposed such that the image moves in a second direction perpendicular to the first direction on the light receiving plane, the detection unit receives light or does not receive light according to pseudo noise code sequences along the second direction respectively on the plurality of light receiving regions, in which two arbitrary pseudo noise code sequences among the pseudo noise code sequences respectively on the plurality of respective light receiving regions are substantially perpendicular to one another, the detection unit outputs an electric signal corresponding to a total amount of light received on the plurality of light receiving regions. The analysis unit analyzes the electric signal output from the detection unit, to obtain an image of the object.

In the imaging devices according to the above respective embodiments, the detection unit may include a mask which is disposed on the light receiving plane, to transmit or block light according to pseudo noise code sequences along the second direction.

In the imaging devices according to the above respective embodiments, the detection unit may include a first light receiving plane which receives light when a pseudo noise code sequence is a first value, and does not receive light when a pseudo noise code sequence is a second value, and a second light receiving plane which receives light when a pseudo noise code sequence is a second value, and does not receive light when a pseudo noise code sequence is a first value, and the detection unit may output an electric signal corresponding to a difference between output signals respectively from the first light receiving plane and the second light receiving plane.

In the imaging devices according to the above respective embodiments, the analysis unit may analyze a signal corresponding to a temporal differentiation of the electric signal output from the detection unit, to obtain an edge enhanced image of the image of the object.

In the imaging devices according to the above respective embodiments, the analysis unit may selectively obtain the image of the object in the background on the basis of an electric signal output from the detection unit when the object is moving in a background, and an electric signal output from the detection unit when there is no object in the background.

In the imaging device according to the above embodiment, in the detection unit, the pseudo noise code sequences respectively on the plurality of light receiving cells may be different from one another, and the analysis unit may analyze an electric signal sampled every time an output value from one of the plurality of light receiving cells of the detection unit changes, to obtain the image of the object. In the imaging device according to the above other embodiment, the analysis unit may analyze an electric signal sampled every time an output value of the detection unit changes, to obtain the image of the object.

The imaging devices according to the respective embodiments may further have an optical system that focuses into an image of the object on the light receiving plane of the detection unit. Further, the imaging devices according to the respective embodiments may further have an optical component which emits the image of the object incident into one end face, from the other end face, to form the image of the object on the light receiving plane, and in this case, the imaging devices according to the respective embodiments may further have an optical system that focuses into the image of the object on the one end face of the optical component. Further, the object may be caused to move on the light receiving plane of the detection unit.

In the imaging devices according to the respective embodiments, the illumination unit may irradiate the object with light in a lighting pattern corresponding to the pseudo noise code sequences along a direction corresponding to the second direction.

In the imaging devices according to the respective embodiments, the detection unit may use code sequences whose periodic auto-correlation functions all become 0 except for 0 shift, or may use code sequences whose aperiodic auto-correlation functions all become 0 except for 0 shift, as the pseudo noise code sequences. Further, the detection unit may use chirp signals in place of the pseudo noise code sequences, and may receive light in accordance with a transmissivity distribution based on the chirp signals along the second direction.

Advantageous Effects of Invention

In accordance with the present invention, it is possible to obtain an image of the object as a still image even in the case where an object is moving at a high velocity.

BRIEF DESCRIPTION OF DRAWINGS

FIG. 6 are diagrams showing intensity distributions along the y direction of an image on the light receiving plane of the detection unit 31 of the imaging device 1 according to the first embodiment.

FIG. 34 is a diagram for explanation of a partial configuration of a detection unit 50 of the imaging device 100 according to the tenth embodiment.

FIG. 36 is a diagram showing signals obtained by the detection unit 50 in the simulation of the operation of the imaging device 100 according to the tenth embodiment.

DESCRIPTION OF EMBODIMENTS

Hereinafter, modes for carrying out the present invention will be described in detail with reference to the accompanying drawings. In addition, the same components in the description of the drawings will be denoted by the same symbols, and the overlapping descriptions will be omitted.

First Embodiment

Figure 1:
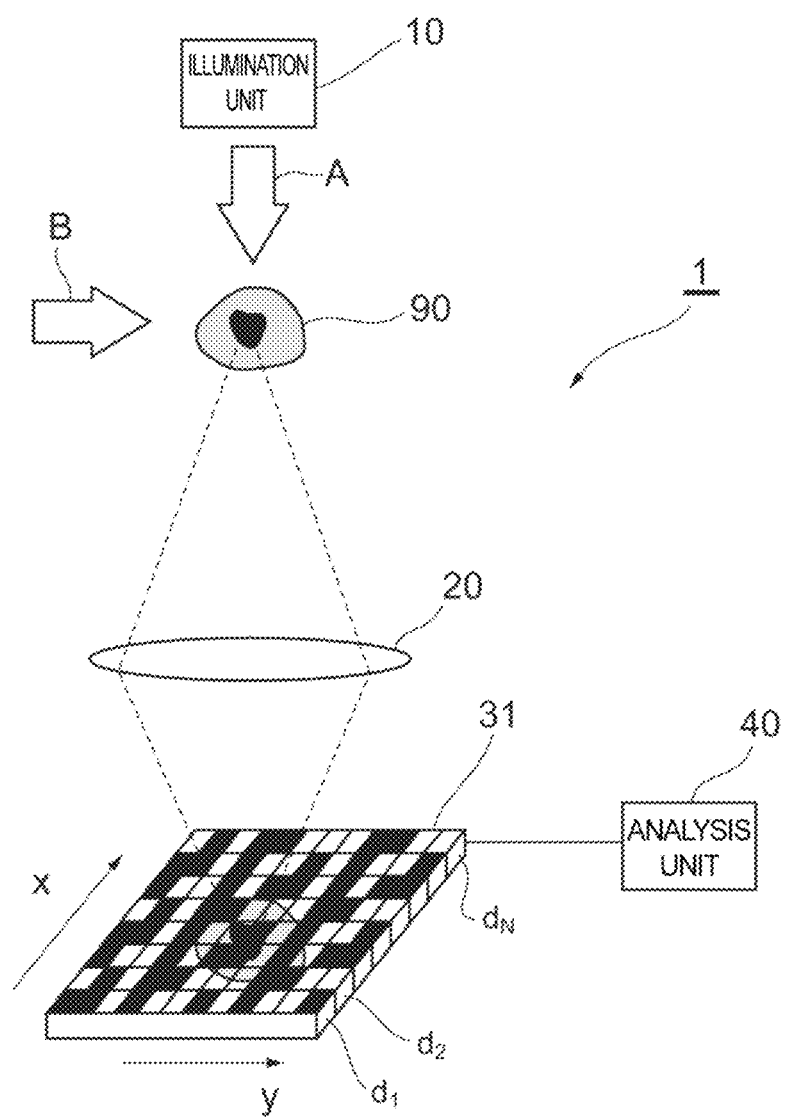
FIG. 1 is a diagram showing a configuration of an imaging device 1 according to a first embodiment.
Figure 2:
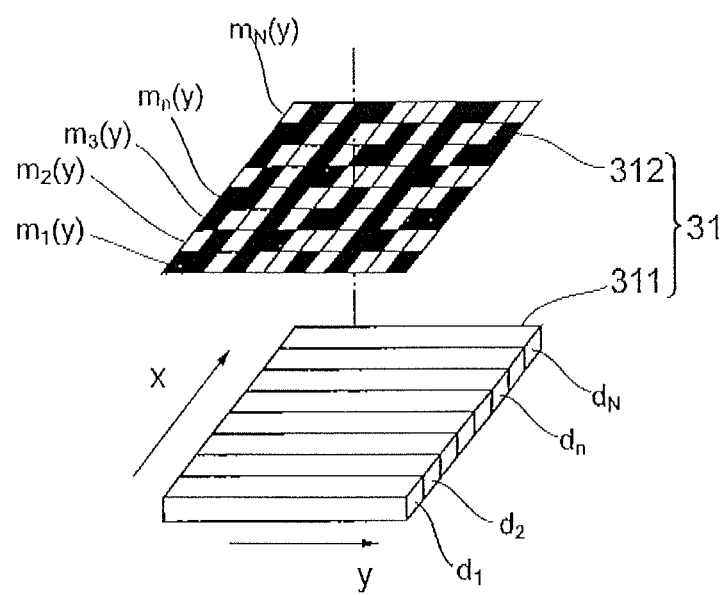
FIG. 2 is a diagram for explanation of a configuration of a detection unit 31 of the imaging device 1 according to the first embodiment.

FIG. 1 is a diagram showing a configuration of an imaging device 1 according to a first embodiment. The imaging device 1 includes an illumination unit 10 that irradiates a moving object 90 with light A, an optical system 20 that focuses into an image of the object 90, a detection unit 31 having a light receiving plane on which the image of the object 90 by the optical system 20 is formed, and an analysis unit 40 which analyzes a detected result by the detection unit 31, to obtain an image of the object 90. FIG. 2 is a diagram for explanation of a configuration of the detection unit 31 of the imaging device 1 according to the first embodiment.

The illumination unit 10 outputs a continuous light or a constant-periodic pulsed light, and irradiates the object 90 with the light A.

The detection unit 31 includes a plurality of light receiving cells $d_1$ to $d_N$ which are arrayed in a first direction (x direction) on the light receiving plane. The detection unit 31 is disposed such that an image moves parallel to a second direction (y direction) on the light receiving plane according to a movement of the object 90 in the direction B. The first direction (x direction) and the second direction (y direction) are perpendicular to one another. The detection unit 31 receives light or does not receive light according to pseudo noise code sequences along the second direction (y direction) respectively on the plurality of light receiving cells $d_1$ to $d_N$, to output electric signals corresponding to the respective amounts of light received on the plurality of light receiving cells $d_1$ to $d_N$. N is an integer of 2 or more.

The detection unit 31 is configured by pasting a mask 312 on a light receiving plane of a one-dimensional line sensor 311. In the one-dimensional line sensor 311, N light receiving cells $d_1$ to $d_N$ are arrayed in the x direction. Each light receiving cell $d_n$ is long in the y direction. Or the case where each light receiving cell $d_n$ may be regarded as being long in the y direction by a method of optically magnifying/reducing an image by a cylindrical lens or the like is included. In the mask 312, N pseudo noise code sequence masks $m_1(y)$ to $m_n(y)$ are arrayed in the x direction. A pseudo noise code sequence mask means a mask on which a pattern is imprinted according to a certain pseudo noise code sequence.

Figure 32:
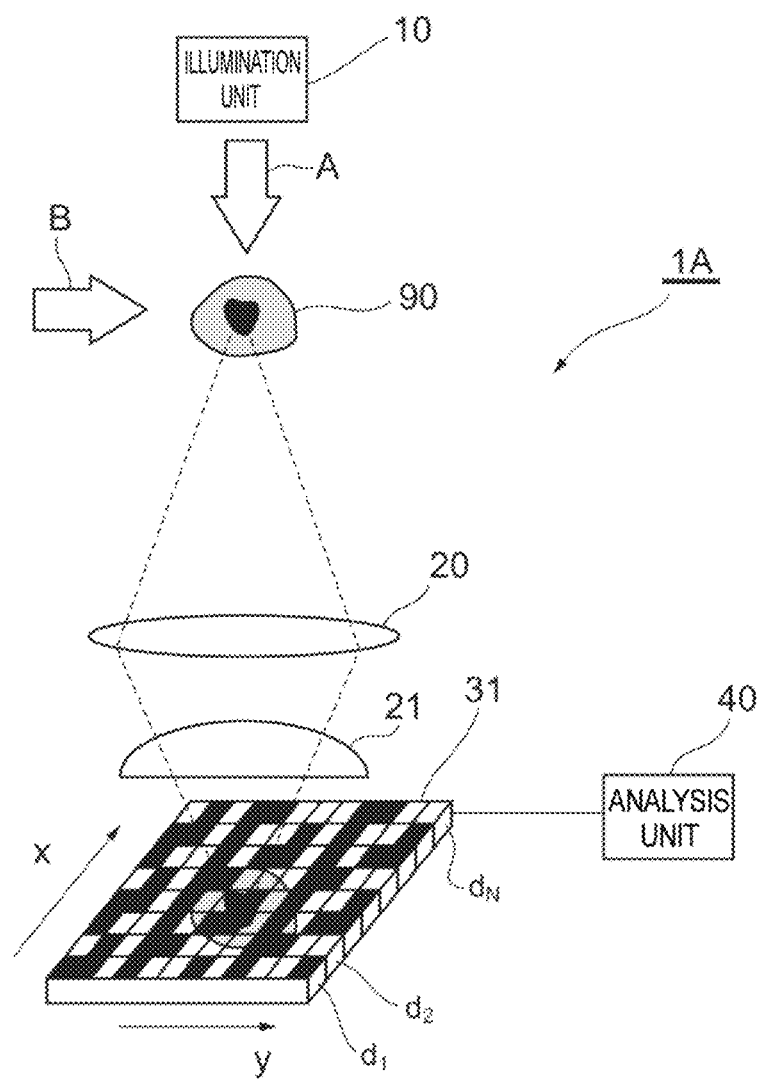
FIG. 32 is a diagram showing a configuration of an imaging device 1A according to a modified example of the first embodiment.

It is preferable for acquiring an image that each pixel of a pseudo noise code sequence mask has a square pixel. However, in the same way as described above, as shown in FIG. 32, the case where each pixel is regarded as a square pixel by optical reduction/extension in the y direction by a cylindrical lens 21 or the like is included. For example, in the case of a pseudo noise code sequence mask whose one pixel has a length of 2 in the x direction, and has a length of 1 in the y direction, as a result of an optical reduction in the y direction of an image, the pixel is regarded as a square pixel. This effect makes a time of focusing into an image on a detector plane longer, which is expected to improve the image quality.

Each pseudo noise code sequence masks $m_n(y)$ is disposed on a corresponding light receiving cells $d_n$, to transmit or block light according to pseudo noise code sequences along the y direction. In the respective FIGS. 1 and 2, one of transmission and blocking of light at the mask 312 is shown in black, and the other one is shown in white. Two arbitrary pseudo noise code sequence $m_{n1}(y)$ and pseudo noise code sequence $m_{n2}(y)$ may be pseudo noise code sequences which are the same as one another, or may be pseudo noise code sequences which are different from one another. n, n1, and n2 are integers of one or more and N or less.

As pseudo noise code sequences, Gold sequences, preferred Gold sequences, orthogonal Gold sequences, Gold-like sequences, Kasami sequences, No sequences, pseudo-ternary M sequences, complementary sequences (refer to Japanese Unexamined Patent Application Laid-Open No. 2008-199140), Barker sequences, Golay sequences (refer to M. J. B. Golay, "Complementary sequence," IRE Transactions on information theory, pp. 82-87, (1961)), self-complementary sequences, complete complementary sequences (refer to S. Naoki, "Modulatable orthogonal sequences and their application to SSMA systems," IEEE trans. on Information The theory, vol. IT-34, pp. 93-100, (1988)), and the like may be used. Other various types of pseudo noise code sequences are published in a non-Patent Document in which M sequences are compiled ("Pseudo-Noise Sequences Based on M-sequence and Its Application for Communications", fundamentals Reviews, Vol. 3, No. 1, 32-42, 2009), and refer to this document.

An M sequence which is one of the pseudo noise code sequences is a binary (1/0 or −1/+1) periodic signal. A first M sequence periodic signal is to be called m1, and a second M sequence periodic signal is to be called m2. M sequences with a period $K=2^9-1$ (=511) with respect to the first M sequence m1, for example, a code sequence composed of 0 and 1 as, $m_1$=[0, 0, 0, 0, 1, 1, 1, 1, 0, 1, 1, 1, 0, 0, 0, 0, 1, 0, 1, 1, . . . *snip* . . . , 1, 0, 1, 1, 1, 1, 0, 0, 0, 0, 0, 1, 1, 1, 1, 1, 1, 1, 1, 1] . . . . Further, an M sequence is a code sequence composed of 0 and 1 as, for example, m$_2$=[0, 0, 0, 0, 0, 1, 1, 1, 1, 0, 1, 1, 1, 1, 1, 0, 0, 0, 1, 0, . . . *snip* . . . , 1, 1, 0, 1, 1, 1, 1, 0, 0, 0, 0, 1, 1, 1, 1, 1, 1, 1, 1, 1]. The pseudo noise code sequence m$_n$(y), for example, blocks light when a code is 0, and transmits light when a code is 1.

Figure 3:
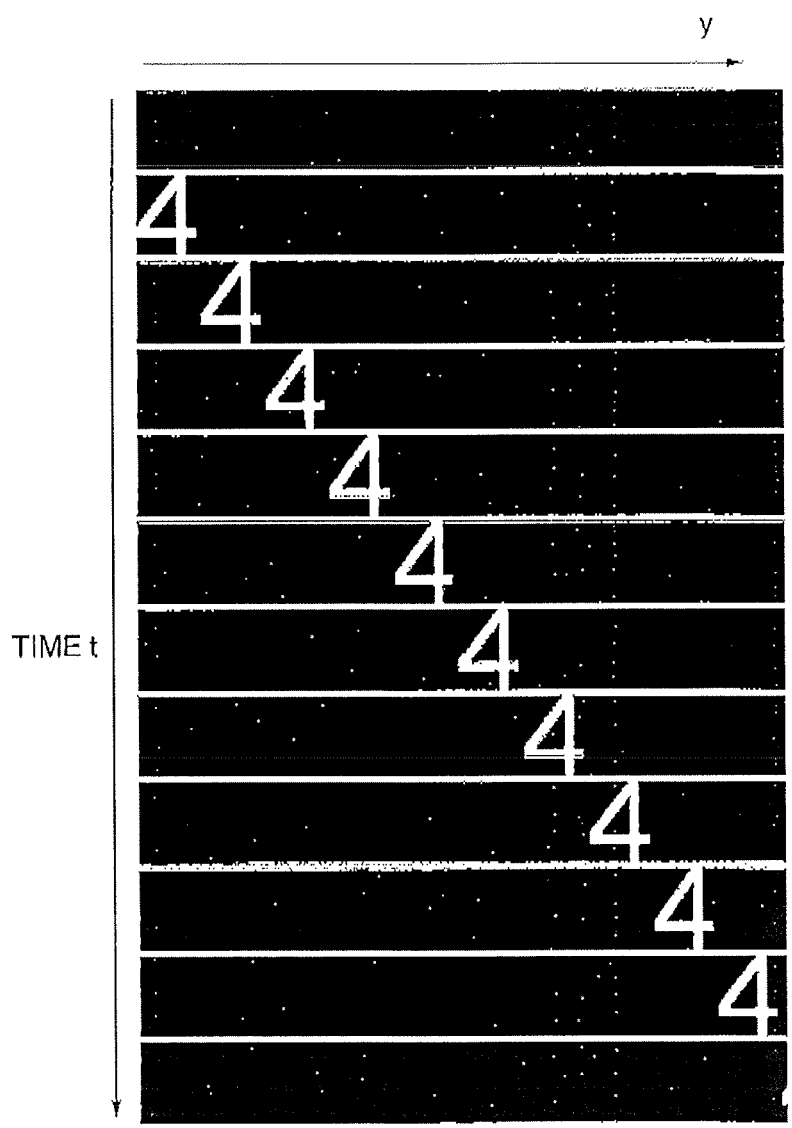
FIG. 3 is a diagram showing an image used for a simulation of the operation of the imaging device 1 according to the first embodiment.

Next, a simulation of the operation of the imaging device 1 according to the first embodiment will be described. FIG. 3 is a diagram showing an image used for the simulation of the operation of the imaging device 1 according to the first embodiment. It is assumed that an white character "4" is moving parallel from left to right in the y direction in a uniform black background. A size of an image of the character on the light receiving plane of the detection unit 31 is 66 pixels in the x direction and 46 pixels in the y direction. The pseudo noise code sequence m$_n$(y) is an M sequence at a period K=511. It is assumed that the 66 pseudo noise code sequences m$_1$(y) to m$_{66}$(y) are set in common. It is assumed that data is output from each light receiving cell d$_n$ of the detection unit 31 every time the image moves by an amount of one code in the y direction. Given that a time required for moving the image by an amount of one code in the y direction is Δt, a time in which the image stays on even one portion of the mask 312 is 556Δt(=(511+46−1)Δt).

Figure 4:
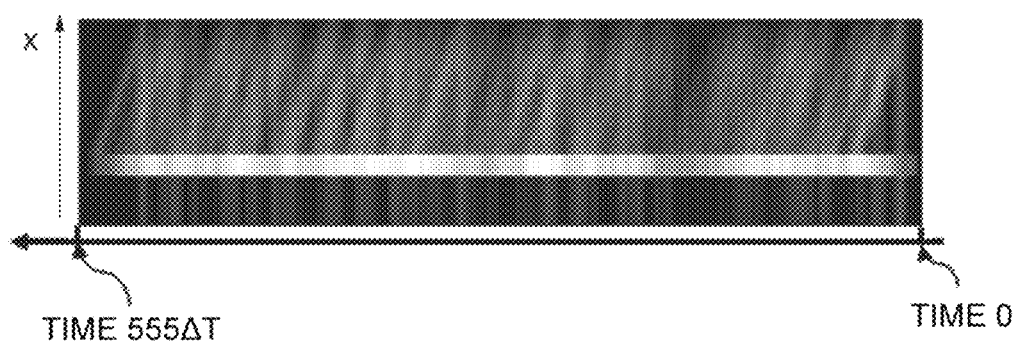
FIG. 4 is a diagram showing a signal obtained by the detection unit 31 in the simulation of the operation of the imaging device 1 according to the first embodiment.

FIG. 4 is a diagram showing a signal obtained by the detection unit 31 in the simulation of the operation of the imaging device 1 according to the first embodiment. In the diagram, the horizontal axis shows times, and the vertical axis shows pixel locations in the x direction. In the diagram, the right endpoint is output data from the detection unit 31 at the time 0 (in a state at the top stage in FIG. 3), and the left endpoint is output data from the detection unit 31 at the time 555Δt (in a state at the bottom stage in FIG. 3).

Figure 5:
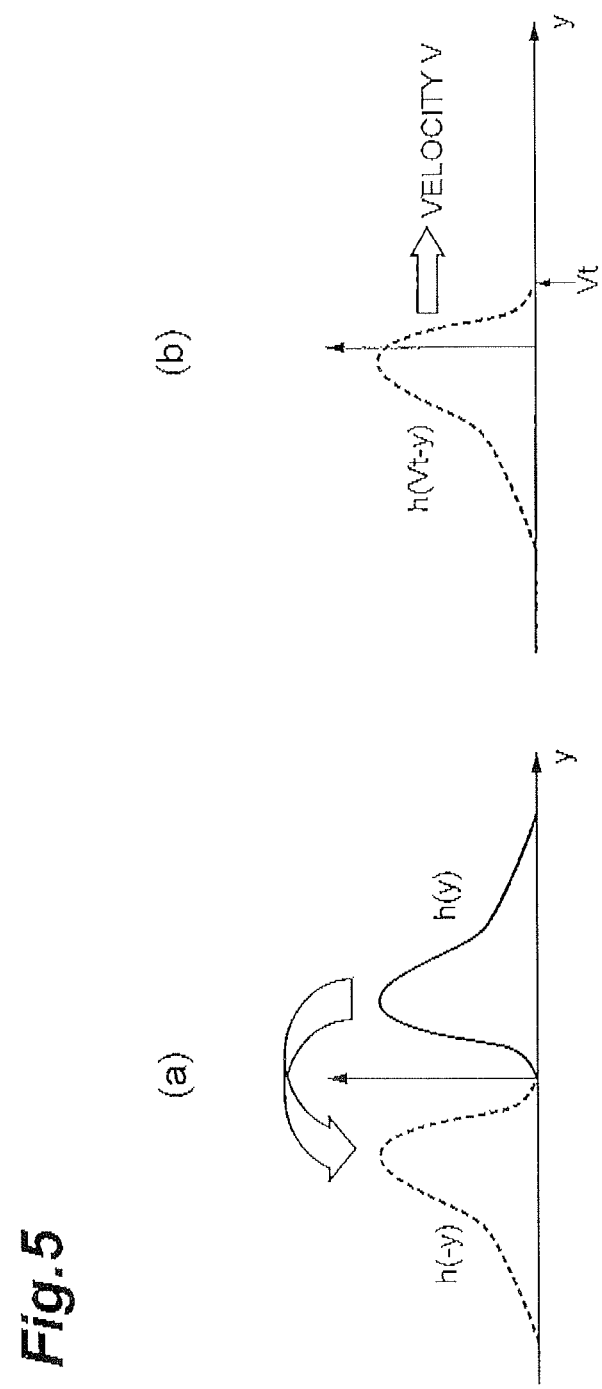
FIG. 5 are diagrams showing intensity distributions along a y direction of an image on a light receiving plane of the detection unit 31 of the imaging device 1 according to the first embodiment.

Next, a signal obtained by the detection unit 31 will be described by use of FIGS. 5 and 6, and mathematical formulas. FIGS. 5 and 6 are diagrams showing intensity distributions along the y direction of an image on the light receiving plane of the detection unit 31 of the imaging device 1 according to the first embodiment. Part (a) of FIG. 5 shows an intensity distribution h(y) along the y direction of an image on a certain light receiving cell d$_n$ of the light receiving plane by a solid line, and shows a distribution h(−y) that the intensity distribution h(y) is inverted with respect to the y axis by a dashed line. In fact, there is no problem for the purpose of calculation in hypothetically handling an image focused on the light receiving plane as an image inverted with respect to the y axis. Part (b) of FIG. 5 shows a distribution h (Vt−y) at a time t when the hypothetically inverted distribution h (−y) is moving in the +y direction at a velocity V.

Part (a) of FIG. 6 shows a situation in which a result of multiplication of the distribution h (Vt−y) at the time t and the pseudo noise code sequence m(y) reaches the light receiving cell d$_n$. A light intensity i$_{dn}$ (Vt, y) at a position y on the light receiving cell d$_n$ at the time t is expressed by the following formula (1). Accordingly, a signal at the time t which is obtained on one light receiving cell d$_n$ with a pixel length of L in the y direction is obtained by integration of the formula (1) in the y direction in a zone [0 to L], that is expressed by the following formula (2). In addition, L denotes a length in the y direction of a light receiving cell, or in the case where a light receiving cell is optically reduced/extended by a lens or the like, L denotes its equivalent length.

[Mathematical formula 1]

$$i_{dn}(Vt,y)=h(Vt-y)m(y) \quad (1)$$

[Mathematical formula 2]

$$I_{dn}(Vt)=\int_0^L i_{dn}(Vt,y)dy=\int_0^L h(y)m(Vt-y)dy \quad (2)$$

In addition, h(Vt−y) is substituted by h(y), and m(y) is substituted by m(Vt−y) in the formula (2). Meanwhile, the formula (2) is derived by simple variable transformation and a shift in an integral range. That is, as shown in FIG. 5, an image on a light receiving cell d$_n$ is not regarded as the distribution h(Vt−y) that the intensity distribution h(y) is inverted with respect to the y axis, but may be regarded as a pseudo noise code sequence m(Vt−y) that a pseudo noise code sequence m(y) is inverted with respect to the y axis, which moves at a velocity V.

Given that Vt=y', the formula (2) is expressed by the following formula (3). Here, an index d$_n$ of I$_{dn}$(y') denotes output data of a light receiving cell d$_n$ at a position x in the x direction. The formula (3) expresses a convolution integral of the pseudo noise code sequence m(y) and the intensity distribution h(y). That is, by merely pasting the pseudo noise code sequence mask m$_n$(y) onto the light receiving cell d$_n$, it is possible to obtain a result of a convolution integral of the pseudo noise code sequence m$_n$(y) and the intensity distribution h(y) as a temporal waveform of a signal output from the light receiving cell d$_n$. FIG. 4 shows a result of such a convolution integral. Such an effect is due to output of a signal of a value corresponding to a total intensity of a light received by the respective light receiving cells d$_n$. On the other hand, in the case of a detection unit having a two-dimensional pixel structure, the processing circuit merely becomes complex, that is, this is an unnecessary structure for the purpose of a convolution integral.

[Mathematical formula 3]

$$I_{dn}(y')=\int_0^L i_{dn}(y',y)dy=\int_0^L h(y)m(y'-y)dy \quad (3)$$

Next, analysis processing by the analysis unit 40 of the imaging device 1 according to the first embodiment will be described. M sequences are adopted as pseudo noise code sequences, and are called m(y). When a sequence in which the elements 0 of the pseudo noise code sequence m(y) are set to −1, and the elements 1 of the pseudo noise code sequence m(y) are set to 1 is set to m'(y), a pair of these m(y) and m'(y) is called a pseudo-orthogonal M sequence pair. A cross-correlation function r(τ) between the above-described formula (3) and the pseudo noise code sequence m'(y) is expressed by the following formula (4). However, R$_{mm}$' is expressed by the following formula (5). Resultantly, the formula (4) expresses that a correlation function of m' (y') and I$_{dn}$(y') becomes a convolution integral of the intensity distribution h(y) and the R$_{mm}$'(y). In particular, when the R$_{mm}$' is a function corresponding to the Dirac delta function, which becomes 0 except for 0 shift, it is possible to obtain a waveform proportional to the intensity distribution h(y) as r$_{dn}$.

[Mathematical formula 4]

$$\begin{aligned} r_{dn}(\tau) &= \int m'(y') I_{dn}(y' + \tau) dy' \\ &= \int m'(y') \left[ \int h(y) m(y' + \tau - y) dy \right] dy' \\ &= \int h(y) \left[ \int m'(y') m(y' + \tau - y) dy' \right] dy \\ &= \int h(y) R_{mm'}(\tau - y) dy \\ &= h(y) * R_{mm'}(y) \end{aligned} \qquad (4)$$

[Mathematical formula 5]

$$R_{mm'}(\tau) = \int m'(t) m(t + \tau) dt \qquad (5)$$

Meanwhile, in the case where a pseudo-orthogonal M sequence pair is adopted as a pseudo noise code sequence, because the periodic correlation characteristics thereof become 0 except for 0 shift, the formula (4) is preferably performed as a periodic cross-correlation operation. For example, in the case where a self-complementary sequence is adopted as a pseudo noise code sequence, because the aperiodic correlation characteristics thereof become 0 except for 0 shift, the formula (4) is preferably performed as a aperiodic cross-correlation operation (refer to a tenth embodiment which will be described later). When the image h(y) is regarded as a periodic function, and a waveform out of the visual field returns back as shown in Part (b) of FIG. 6, the above-described formula (3) means a circular convolution integral. When the above-described formula (3) as a circular convolution integral is a matrix notation, this is as the following formula (6). Here, because $T_{dn}$ (y') is a result of time sampling to be obtained from a light receiving cells $d_n$, which becomes discrete time-series data, that is simply a matrix notation as $I_i$. On the other hand, when the above-described formula (4) is a matrix notation, this is as the following formula (7).

[Mathematical formula 6]

$$\begin{aligned} I_{dn} &= (I_1 I_2 \ldots I_K)^T \\ &= \begin{pmatrix} m(1) & m(2) & & m(K) \\ m(2) & m(3) & & m(1) \\ \vdots & \vdots & \ldots & \vdots \\ m(K) & m(1) & & m(K-1) \end{pmatrix} \begin{pmatrix} h(1) \\ h(2) \\ \vdots \\ h(K) \end{pmatrix} \\ &= Mh \end{aligned} \qquad (6)$$

[Mathematical formula 7]

$$\begin{aligned} r_{dn} &= (r_1 r_2 \ldots r_K)^T \\ &= M'^T M h \\ &= \frac{1}{2} \begin{pmatrix} K+1 & 0 & \ldots & 0 \\ 0 & K+1 & \ldots & 0 \\ \vdots & \vdots & \ddots & \vdots \\ 0 & 0 & \ldots & K+1 \end{pmatrix} h \\ &= \frac{K+1}{2} E h \end{aligned} \qquad (7)$$

Here, E is a unit matrix of K rows and K columns. Resultantly, a periodic cross-correlation function $r_{dn}(\tau)$ between the $I_{dn}$ (y') and the pseudo noise code sequence m'(y) in the above-described formula (3) expresses the image h(y) whose amplitude is amplified by (K+1)/2 times. That is, a still image of the object 90 is amplified in luminance to be obtained.

A specific example of a pseudo-orthogonal M sequence pair is shown as follows, A pair m' with respect to an M sequence m expressed by formula (8) is expressed by formula (9). A periodic auto-correlation function $R_{mm}$ of the pseudo noise code sequence m is expressed by formula (10). A periodic auto-correlation function $R_{m'm'}$ of the pseudo noise code sequence m' is expressed by formula (11). Those are not 0 even except for 0 shift in the formula (10) and the formula (11). Further, a periodic auto-correlation function $R_{mm'}$ of the pseudo-orthogonal M sequence pairs m and m' is expressed by formula (12).

[Mathematical formula 8]

$$m = [0\ 1\ 0\ 0\ 1\ 1\ 1] \qquad (8)$$

[Mathematical formula 9]

$$m' = [-1\ 1\ -1\ -1\ 1\ 1\ 1] \qquad (9)$$

[Mathematical formula 10]

$$R_{mm} = [2\ 2\ 2\ 4\ 2\ 2\ 2] \qquad (10)$$

[Mathematical formula 11]

$$R_{m'm'} = [-1\ -1\ -1\ 7\ -1\ -1\ -1] \qquad (11)$$

[Mathematical formula 12]

$$R_{mm'} = [0\ 0\ 0\ 4\ 0\ 0\ 0] \qquad (12)$$

In this way, the periodic auto-correlation function $R_{mm'}$ of the pseudo-orthogonal M sequence pair m and m' is a correlation function all becoming 0 except for 0 shift. "0 shift" means that an amount of delay τ of the formula (5) at the time of finding a correlation function is 0. A value 4 appears as the fourth element in the formula (12). This corresponds to that a correlation function with τ=0 is placed in the center of the elements. That is, a correlation function corresponding to an amount of delay τ expressed by formula (13) is the formula (10) to the formula (12).

[Mathematical formula 13]

$$\tau = [-3\ -2\ -1\ 0\ +1\ +2\ +3] \qquad (13)$$

Figure 7:
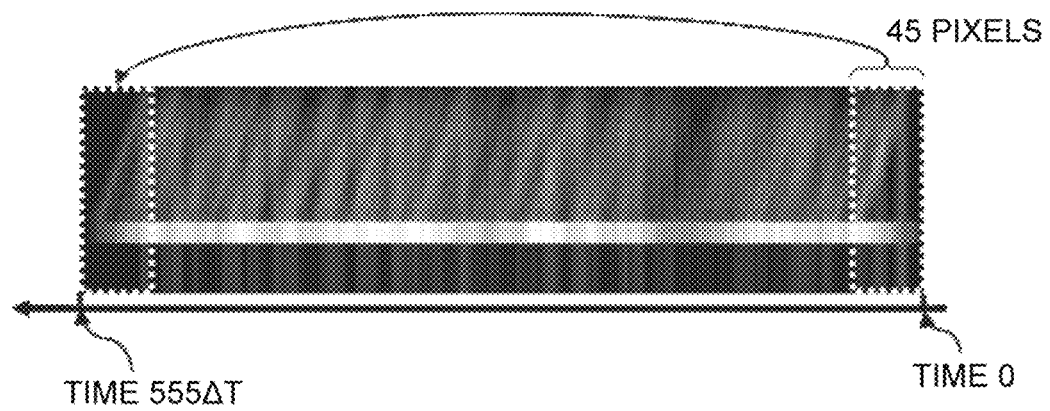
FIG. 7 is a diagram for explanation of analysis processing by an analysis unit 40 of the imaging device 1 according to the first embodiment.

The analysis unit 40 utilizes the above-described relationship, thereby demodulating the image of the object 90 on the basis of the signal (FIG. 4) obtained by the detection unit 31. Because the output signal from the detection unit 31 is a result of a linear convolution integral, it is necessary to correct this result into a form of a circular convolution integral. In order to obtain a specific circular convolution integral, as shown in FIG. 7, the data for a time of 45Δt from a time t1=0 to a time t2=44Δt is removed, and is cumulatively added to the data from a time t3=511Δt to a time t4=555Δt. FIG. 7 is a diagram schematically showing a situation in which the result of the linear convolution integral in FIG. 4 is transformed into a form of a circular convolution integral. The cumulative addition is to execute the following formula (14). In the formula (14), S(x1:x2, t1:t2) is a symbol that the elements surrounded by [x1 to x2] in the x direction and [t1 to t2] in the time t direction in the result shown in FIG. 7 are regarded as a matrix. Thereby correcting it into a form of the circular convolution integral shown in the formula (6).

[Mathematical formula 14]

$$S(1:66,511:555)=S(1:66,0:44)+S(1:66,511:555) \quad (14)$$

Figure 8:
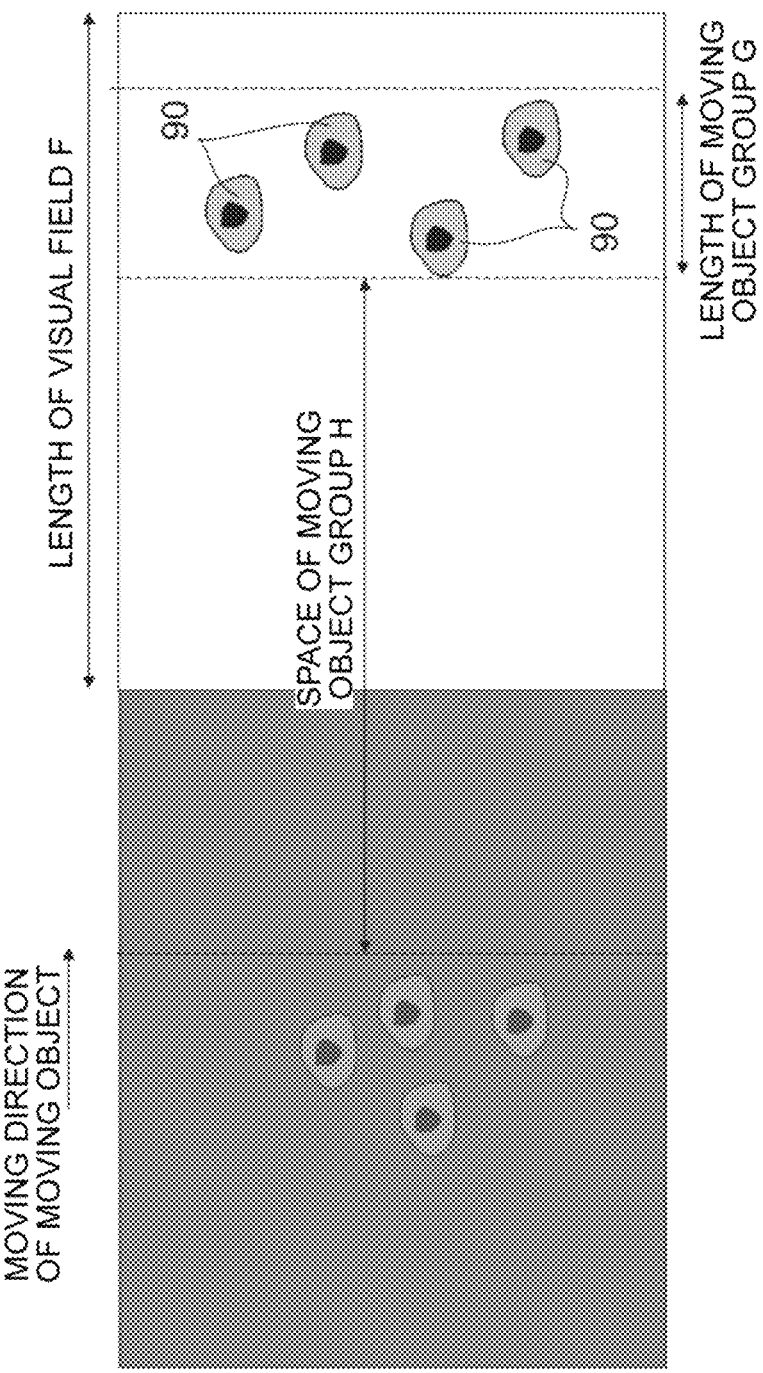
FIG. 8 is a diagram for explanation of a relationship between a visual field and an object group.

In addition, it is assumed that the relationship between the visual field and the object group is kept as shown in FIG. 8 in order not to cause superimposing of a group and another group of the different objects 90 by an operation of the formula (14). That is, it is necessary for the following formula (15) to be made with respect to a visual field length Fin the y direction, a length of the object group G in the y direction, and a distance H between one group and the following group of the objects in the y direction.

[Mathematical formula 15]

$$G<F<H \quad (15)$$

Figure 9:
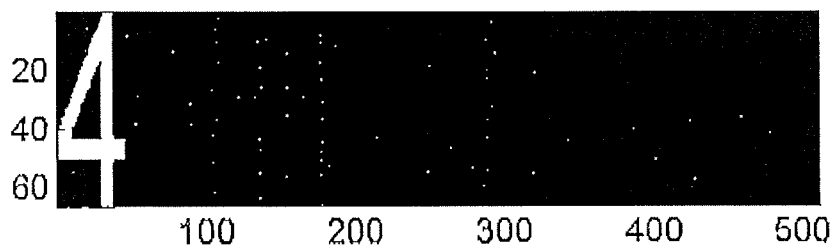
FIG. 9 is a diagram showing an image obtained by the analysis unit 40 in the simulation of the operation of the imaging device 1 according to the first embodiment.

FIG. 9 is a diagram showing an image obtained by the analysis unit 40 in the simulation of the operation of the imaging device 1 according to the first embodiment. A still image h(y) as shown in FIG. 9 is obtained by applying an operation of the above-described formula (7) to each row (each pixel) transformed into a circular convolution integral by the formula (14).

Figure 10:
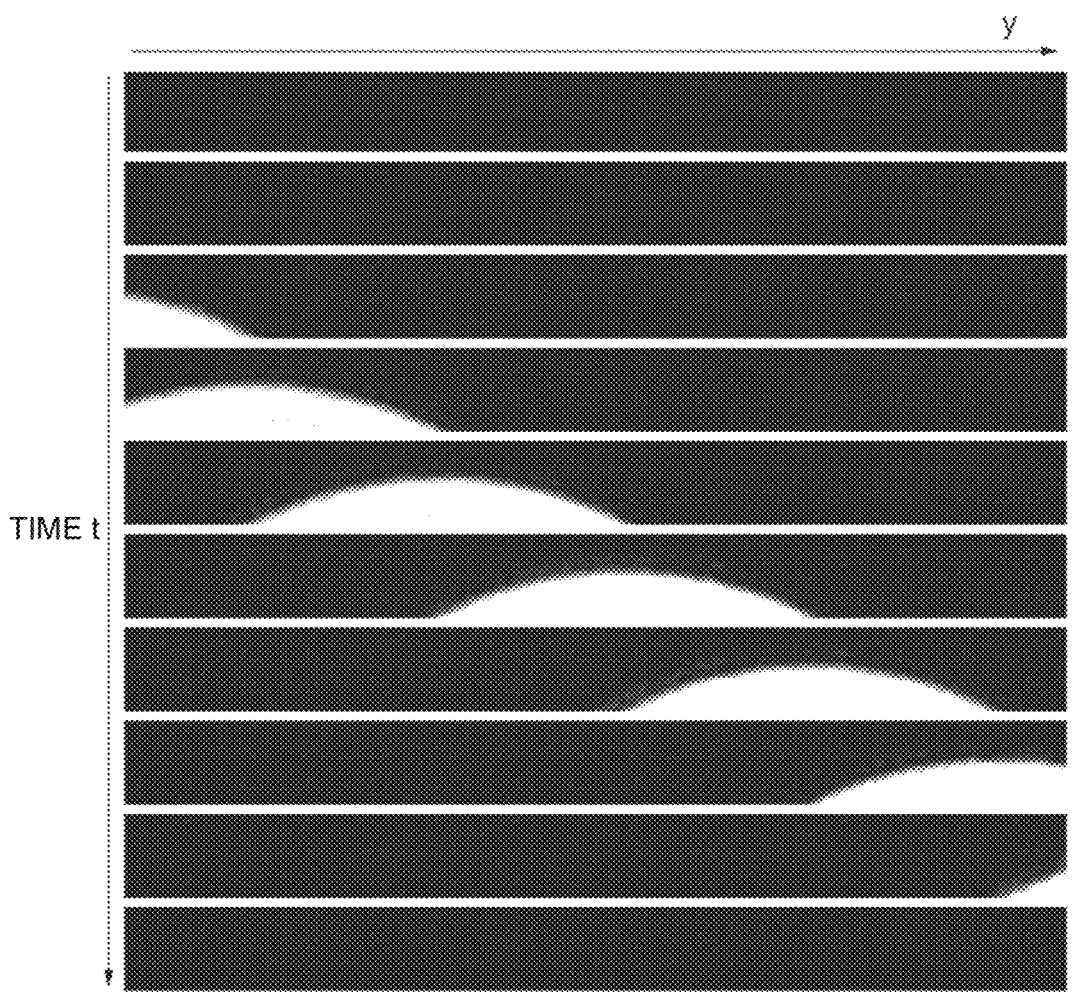
FIG. 10 is a diagram showing an image used for another simulation of the operation of the imaging device 1 according to the first embodiment.
Figure 11:
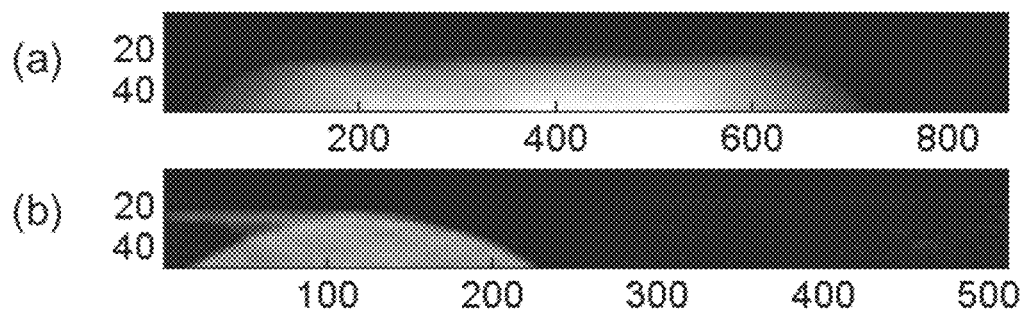
FIG. 11 are diagrams showing images obtained by the analysis unit 40 in the other simulation of the operation of the imaging device 1 according to the first embodiment.

FIGS. 10 and 11 are diagrams showing examples of another simulation of the operation of the imaging device 1 according to the first embodiment. FIG. 10 is a diagram showing an image used for the other simulation. FIG. 11 are diagrams showing images obtained by the analysis unit 40 in the other simulation. Here, a circular opening with a diameter of 200 μm is moved at a velocity of 14 μm/sec., and is photographed with a 30-fps CCD camera by use of an objective lens of 20 magnifications. The CCD camera has 480(x)×640(y) pixels, and one pixel size is 8.3×8.3 μm. The actually used pixels are 44(x)×511(y). In accordance with the formula (2) or the formula (3), a convolution integral of the obtained image (44×511 pixels) and the pseudo noise code sequence is computed in a calculator. As a result, it is possible to simulate output data from the one-dimensional line sensor whose pseudo noise code sequences are masked even by use of a two-dimensional detector. FIG. 10 shows a situation in which a part of the circular opening moves from left to right in the visual field at a constant velocity. Part (a) of FIG. 11 shows output data from a one-dimensional line sensor having 44 pixels with the horizontal axis showing times, and the vertical axis showing the pixel number. Part (b) of FIG. 11 is a result of demodulation of the part of the circular opening by utilizing the formula (7).

As described above, the imaging device 1 according to the present embodiment is capable of obtaining a still image of a moving object by use of the one-dimensional line sensor. The imaging device 1 according to the present embodiment is not to generate pseudo noise code sequences as a time-series signal, but has a pseudo noise code sequence mask fixed onto the light receiving plane of the one-dimensional line sensor. Accordingly, the imaging device 1 according to the present embodiment is capable of obtaining a still image of the object even in the case where an object is moving at a high velocity.

Second Embodiment

Figure 12:
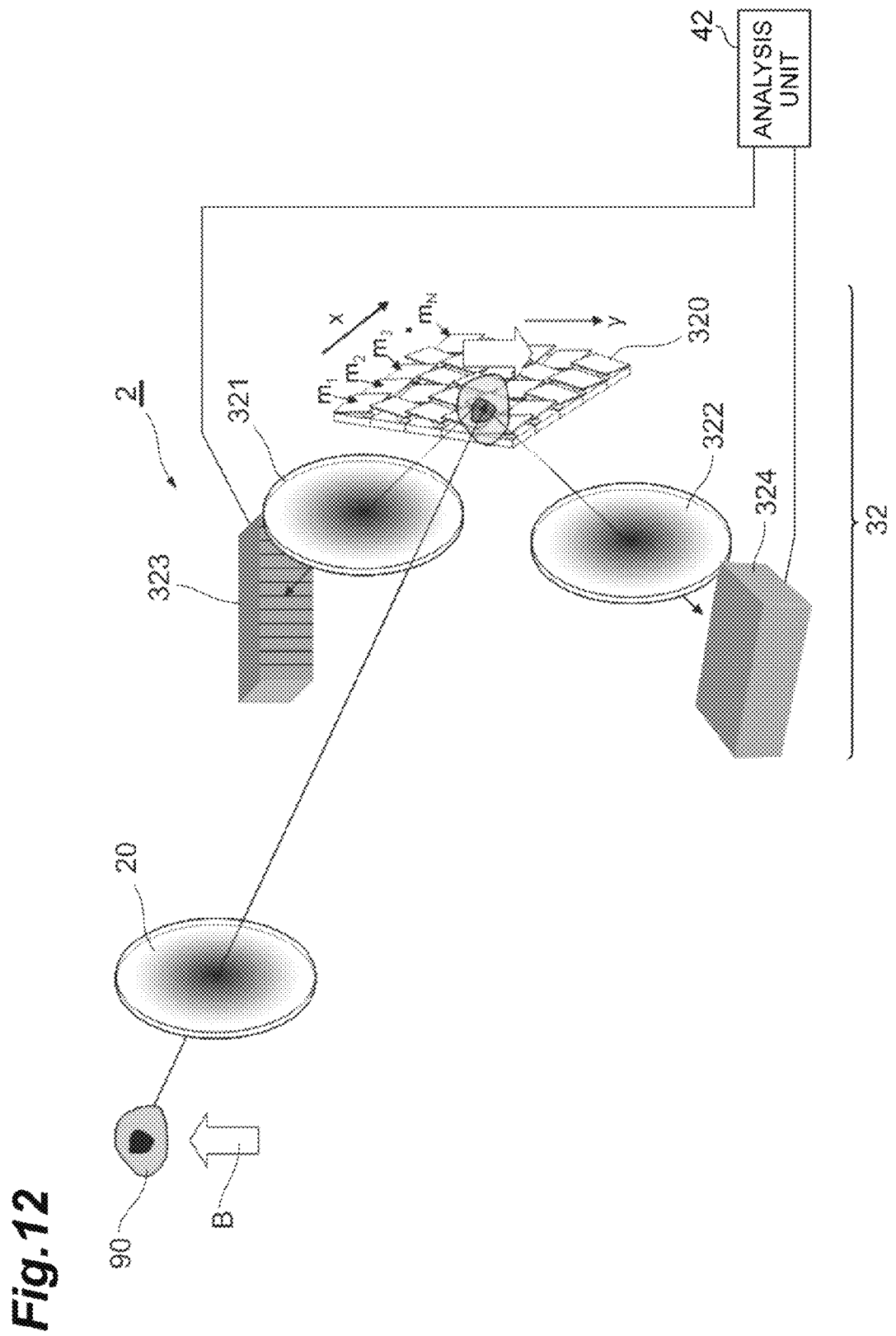
FIG. 12 is a diagram showing a configuration of an imaging device 2 according to a second embodiment.
Figure 13:
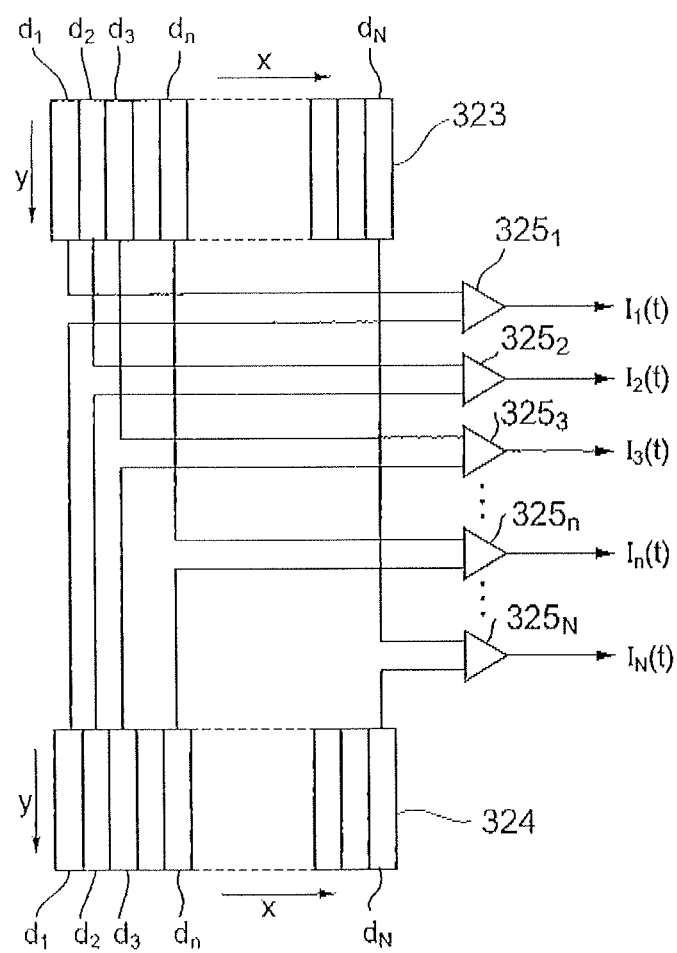
FIG. 13 is a diagram for explanation of a partial configuration of a detection unit 32 of the imaging device 2 according to the second embodiment.

FIG. 12 is a diagram showing a configuration of an imaging device 2 according to a second embodiment. The imaging device 2 includes an illumination unit that irradiates the moving object 90 with light, an optical system 20 that focuses into an image of the object 90, a detection unit 32 having a light receiving plane on which the image of the object 90 by this optical system 20 is formed, and an analysis unit 42 which analyzes a detected result by the detection unit 32, to obtain an image of the object 90. FIG. 13 is a diagram for explanation of a partial configuration of the detection unit 32 of the imaging device 2 according to the second embodiment. These diagrams mainly show the configuration of the detection unit 32 of the imaging device 2 according to the second embodiment. The other components are the same as those in the case of the first embodiment.

The detection unit 32 includes a digital micro-mirror device (DMD) 320, an optical system 321, an optical system 322, a one-dimensional line sensor 323, a one-dimensional line sensor 324, and difference operation units $325_1$ to $325_N$. The DMD 320 is configured such that a plurality of micro-mirrors in which the orientations of their reflecting planes are respectively variable are arrayed in the X direction and the y direction both. These plurality of micro-mirrors are mirrors of substantially 10 μm, and are disposed on the light receiving plane on which an image of the object 90 is formed by the optical system 20.

The optical system 321 focuses into an image of incoming light from the DMD 320 on the light receiving plane of the one-dimensional line sensor 323. The optical system 322 focuses into an image of incoming light from the DMD 320 on the light receiving plane of the one-dimensional line sensor 324. In the one-dimensional line sensor 323 and the one-dimensional line sensor 324 respectively, N light receiving cells $d_1$ to $d_N$ are arrayed in the x direction. Each light receiving cell $d_n$ is long in the y direction, or may be regarded as being long optically. When the object 90 moves in the direction B, an image of the object 90 moves in a direction parallel to the y direction on the respective light receiving planes of the DMD 320, the one-dimensional line sensor 323, and the one-dimensional line sensor 324.

In the DMD 320, N pseudo noise code sequences $m_1(y)$ to $m_n(y)$ are arrayed in the x direction, and each value of a pseudo noise code sequence $m_n(y)$ is arrayed in the y direction, and a micro-mirror at a corresponding position reflects light toward a light receiving cell $d_n$ of one of the one-dimensional line sensor 323 and the one-dimensional line sensor 324 according to the value of the pseudo noise code sequence $m_n(y)$. For example, in the case where an M sequence code taking the binary value of −1/+1 is used as a pseudo noise code sequence $m_n(y)$, a micro-mirror being located at a position of a value of −1 reflects light toward the light receiving cell $d_n$ of the one-dimensional line sensor 323, and a micro-mirror being located at a position of a value of +1 reflects light toward the light receiving cell $d_n$ of the one-dimensional line sensor 324. The pseudo noise code sequence $m_{n1}(y)$ and the pseudo noise code sequence $m_{n2}(y)$ may be the pseudo noise code sequences which are the same as one another, and may be the pseudo noise code sequences which are different from one another.

Figure 14:
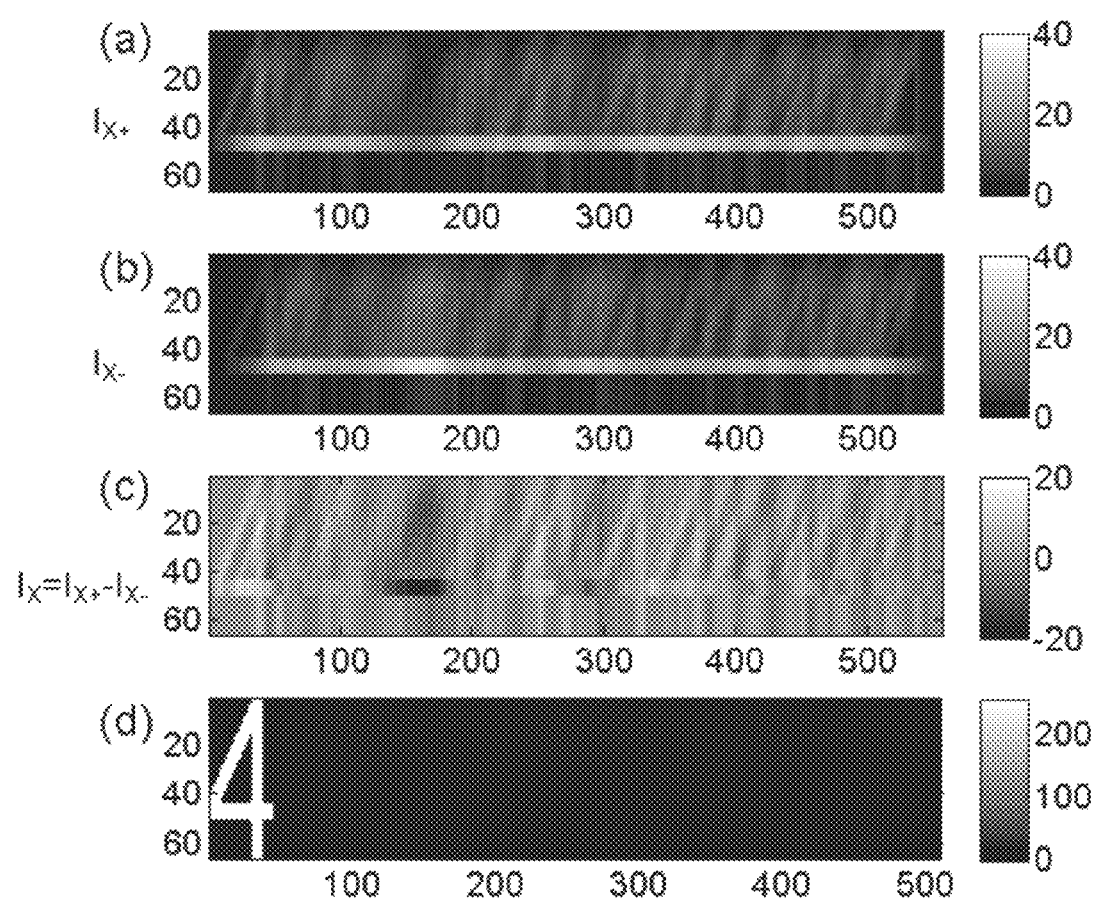
FIG. 14 are diagrams for explanation of signals in the respective processing by difference operation units $325_n$ and an analysis unit 42 of the imaging device 2 according to the second embodiment.

FIG. 14 are diagrams for explanation of signals in the respective processings by the difference operation units $325_n$ and the analysis unit 42 of the imaging device 2 according to the second embodiment. Here, the case where a simulation is performed under the same conditions as the first embodiment will be described. Each difference operation unit $325_n$ outputs a signal $I_{dn}(t)$ (Part (c) of FIG. 14) denoting a difference between data (Part (a) of FIG. 14) output from the light receiving cell $d_n$ of the one-dimensional line sensor 323 and data (Part (b) of FIG. 14) output from the light receiving cell $d_n$ of the one-dimensional line sensor 324. This signal $I_{dn}$ (t) corresponds to the signal $I_{dn}$ (y') in the above-described formula (3). Because an M sequence taking a binary value of −1/+1 is used as a pseudo noise code sequence $m_n(y)$ in the DMD 320, it is possible to obtain a cross-correlation function $R_{mm}'$ all becoming 0 except for 0 shift (the formula (12)) by using a pseudo-orthogonal M sequence pair taking a binary value of 0/+1 demodulating in the analysis unit 42, and it is possible to obtain an image of the object as a still image even in the case where an object is moving at a high velocity by an operation of the formula (4) including the cross-correlation function $R_{mm}'$ (Part (d) of FIG. 14).

Further, in the first embodiment, nearly half of the light reaching the detection unit 31 is received by the one-dimensional line sensor 311. Meanwhile, in the second embodiment, almost all the light reaching the detection unit 32 is received by the one-dimensional line sensor 323 or the one-dimensional line sensor 324. Accordingly, it is possible to take an image in the second embodiment with an amount of light twice in the case according to the first embodiment.

Third Embodiment

Figure 15:
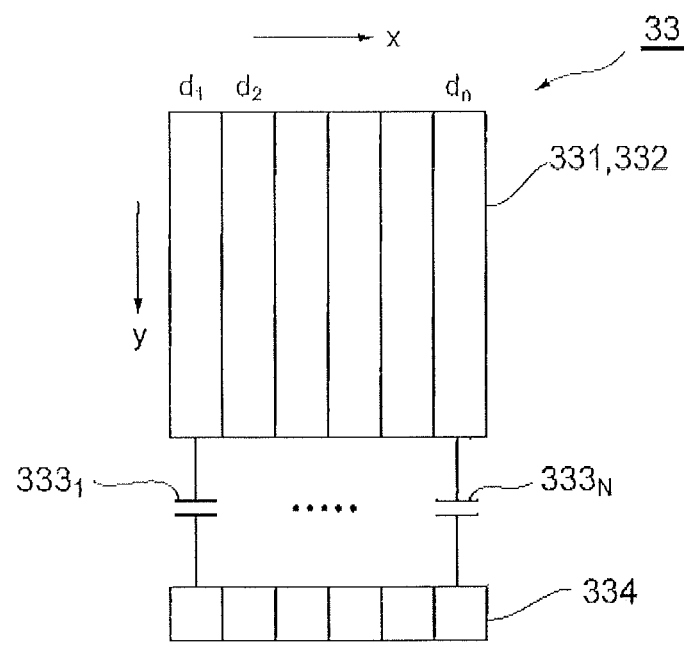
FIG. 15 is a diagram for explanation of a partial configuration of a detection unit 33 of an imaging device 3 according to a third embodiment.

FIG. 15 is a diagram for explanation of a partial configuration of a detection unit 33 of an imaging device 3 according to a third embodiment. The imaging device 3 includes an illumination unit that irradiates a moving object with light, an optical system that focuses into an image of the object, a detection unit 33 having a light receiving plane on which the image of the object by this optical system is formed, and an analysis unit which analyzes a detected result by the detection unit 33, to obtain an image of the object. This diagram mainly shows a configuration of the detection unit 33 of the imaging device 3 according to the third embodiment. The other components are the same as those in the case of the first embodiment.

The detection unit 33 includes a one-dimensional line sensor 331, a mask 332, capacitors $333_1$ to $333_N$, and a CCD shift register 334. The one-dimensional line sensor 331 and the mask 332 are respectively the same as those in the case of the first embodiment. Each capacitor $333_n$, outputs an AC component in an output signal from the light receiving cell $d_n$ of the one-dimensional line sensor 331, to the CCD shift register 334. Electrically-charged signals output from the respective capacitors $333_1$ to $333_N$ are input to the CCD shift register 334 in parallel, and the CCD shift register 334 serially outputs these electrically-charged signals to the analysis unit. The analysis unit obtains an edge enhanced image of an image of an object by processing which is the same as that in the case of the first embodiment on the basis of the electric signals output from the CCD shift register 334.

Figure 16:
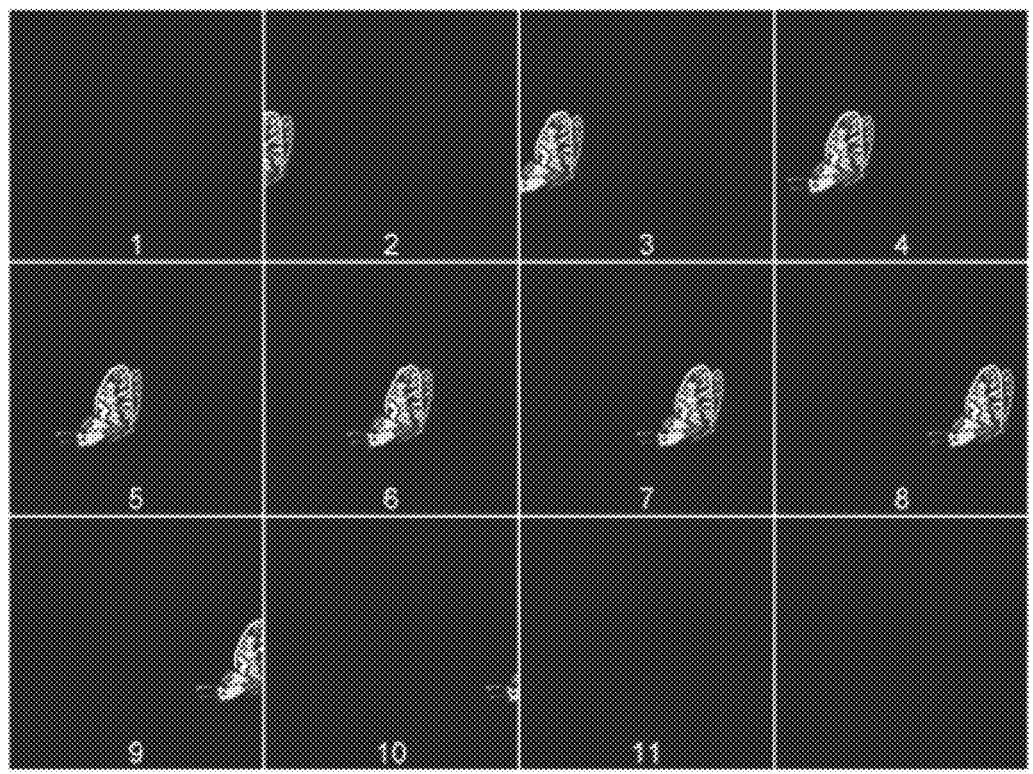
FIG. 16 is a diagram showing images used for a simulation of the operation of the imaging device 3 according to the third embodiment.
Figure 17:
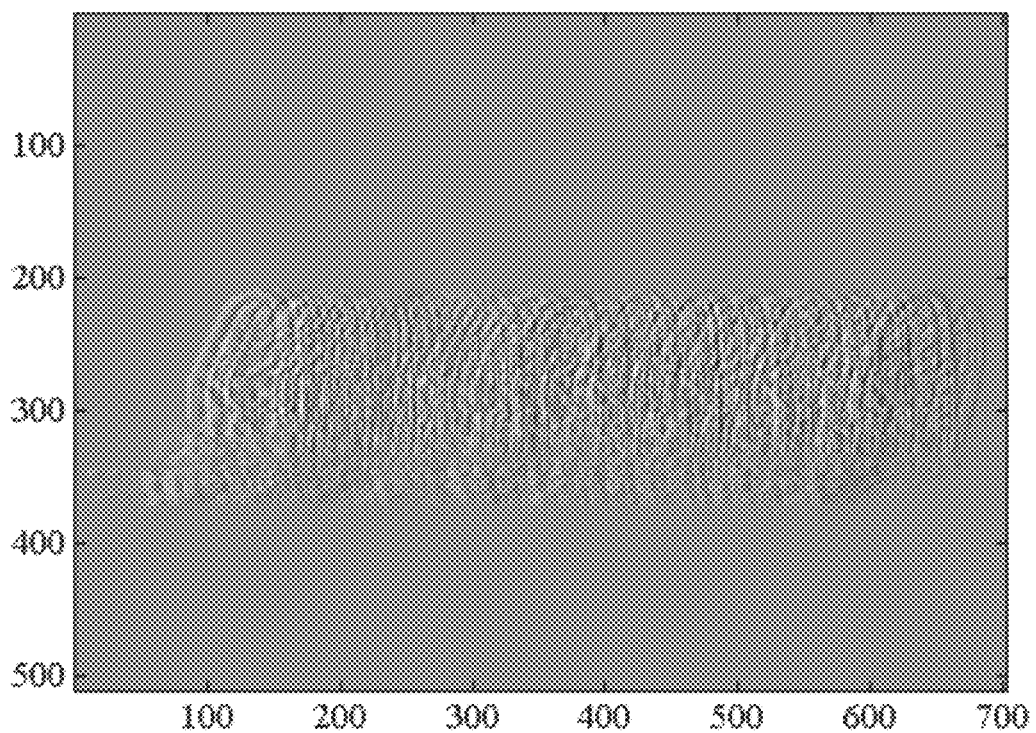
FIG. 17 is a diagram showing a signal obtained by the detection unit 33 in the simulation of the operation of the imaging device 3 according to the third embodiment.
Figure 18:
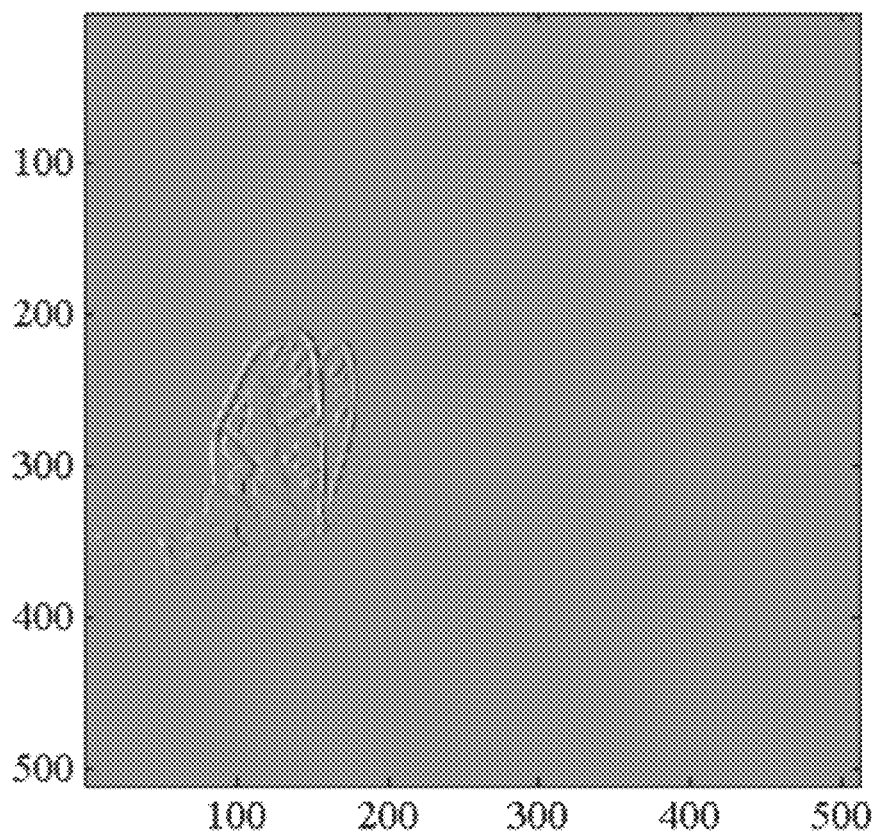
FIG. 18 is a diagram showing an image obtained by the analysis unit in the simulation of the operation of the imaging device 3 according to the third embodiment.

Next, a simulation of the operation of the imaging device 3 according to the third embodiment will be described. FIG. 16 is a diagram showing images which have been used for a simulation of the operation of the imaging device 3 according to the third embodiment. As shown in the diagram, it is assumed that a butterfly object image is moving parallel from left to right in the y direction in a uniform black background. FIG. 17 is a diagram showing a signal obtained by the detection unit 33 in the simulation of the operation of the imaging device 3 according to the third embodiment. In the diagram, the horizontal axis shows times, and the vertical axis shows pixel locations in the x direction. FIG. 18 is a diagram showing an image obtained by the analysis unit 33 in the simulation of the operation of the imaging device 3 according to the third embodiment. As shown in the diagram, in the present embodiment, a signal corresponding to a temporal differentiation of the electric signal output from the detection unit is analyzed by the analysis unit, thereby obtaining an edge enhanced image of the image of the object which is moving at a high velocity. In addition, in the present embodiment, at the time of obtaining an edge enhanced image of the image of the object, erasure of the background as well may be simultaneously realized.

The operation of the present embodiment will be described as follows by use of mathematical formulas. Given that a luminance distribution in the y direction of the background is b(y), the following formula (16) is obtained from the above-described formulas (2) and (3). A difference between the formula (16) when a variable y'(=Vt) related to time is $y_1$, and the formula (16) when a variable y' is $y_2$ is determined, thereby obtaining the following formula (17). From this formula (17), it is understood that the background luminance distribution b(y) is erased simultaneously with a difference image Δh(y) in a moving direction of the object being obtained.

[Mathematical formula 16]

$$I_{dn}(y') = \int_0^L [h(y'-y)+b(y)]m(y)\,dy \tag{16}$$

[Mathematical formula 17]

$$\begin{aligned}\Delta I(y') &= I_{dn}(y_2')-I_{dn}(y_1') \\ &= \int_0^L [h(y_2'-y)-h(y_1'-y)]m(y)\,dy \\ &= \int_0^L \Delta h(y'-y)m(y)\,dy\end{aligned} \tag{17}$$

Fourth Embodiment

A configuration of an imaging device according to a fourth embodiment is substantially the same as that shown in FIG. 1. However, the imaging device according to the fourth embodiment is characterized in the point of processing content by its analysis unit. The analysis unit in the fourth embodiment selectively obtains an image of the object in the background on the basis of an electric signal output from the detection unit when the object is moving in a background, and an electric signal output from the detection unit when there is no object in the background.

Figure 19:
FIG. 19 is a diagram showing images used for the simulation of the operation of an imaging device according to a fourth embodiment.
Figure 20:
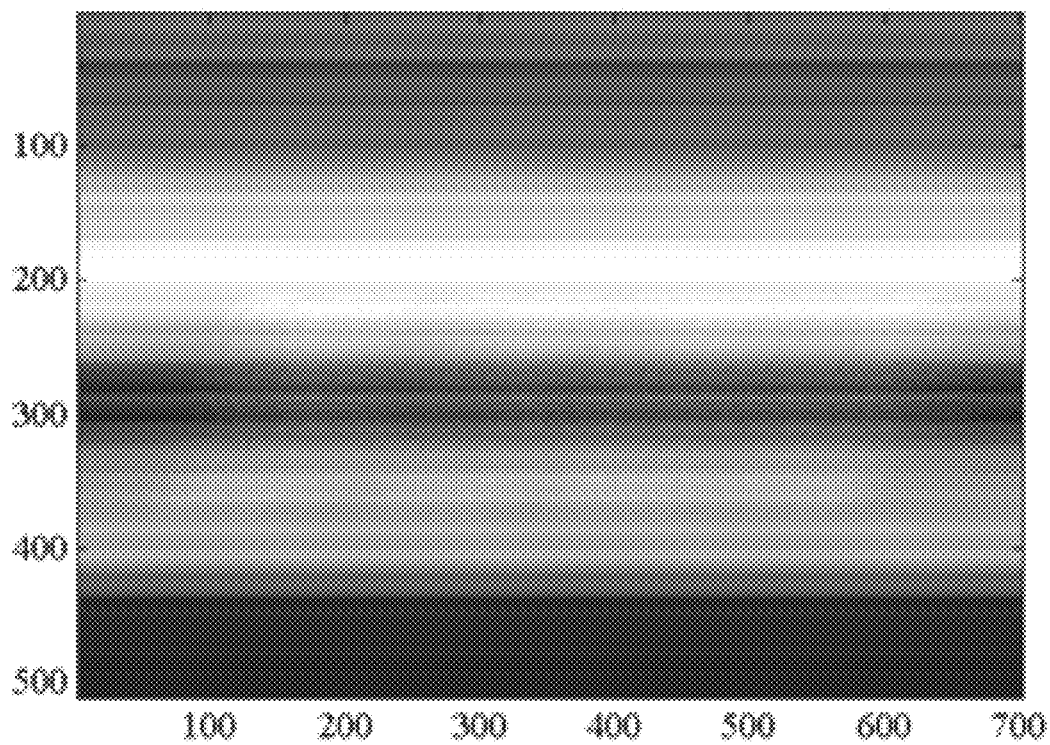
FIG. 20 is a diagram showing a signal obtained by a detection unit when a butterfly object image is moving in a background in the simulation of the operation of the imaging device according to the fourth embodiment.
Figure 21:
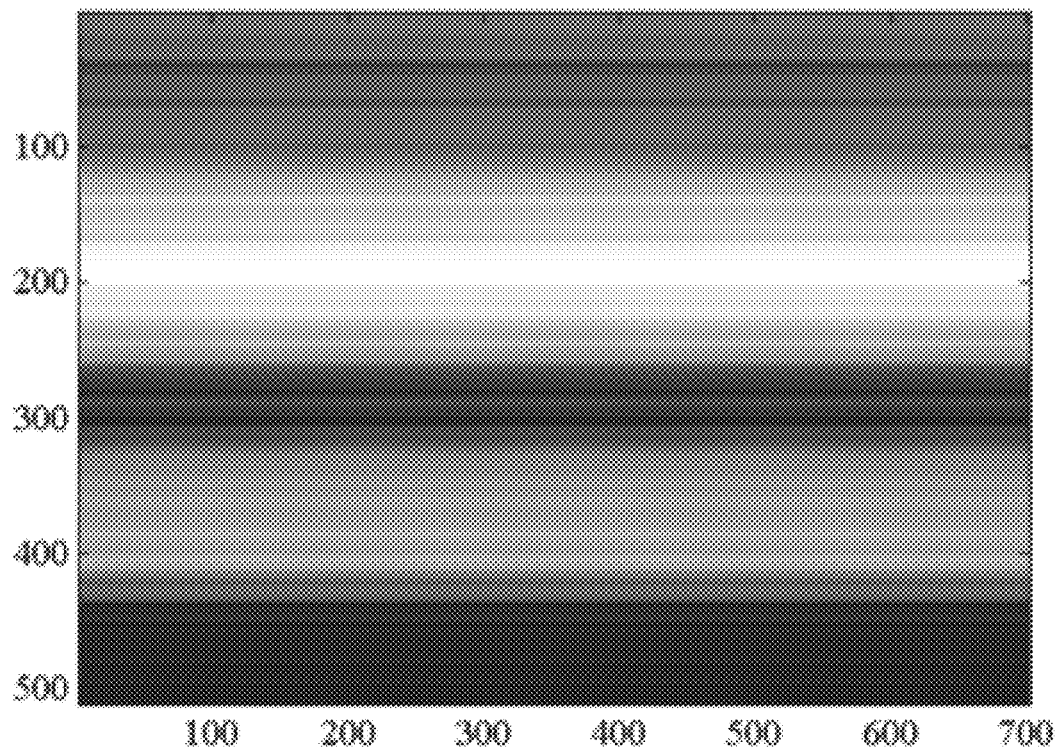
FIG. 21 is a diagram showing a signal obtained by the detection unit when there is no butterfly object image in the background in the simulation of the operation of the imaging device according to the fourth embodiment.
Figure 22:
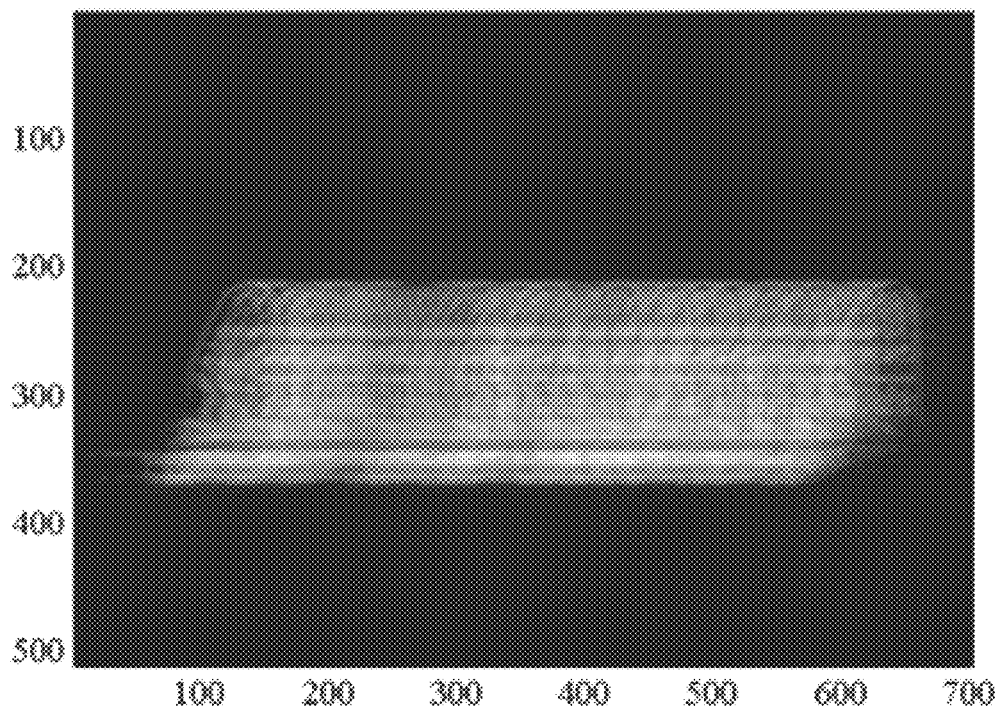
FIG. 22 is a diagram showing a signal obtained by subtracting the signal shown in FIG. 21 from the signal shown in FIG. 20 in the simulation of the operation of the imaging device according to the fourth embodiment.

A simulation of the operation of the imaging device according to the fourth embodiment will be described. FIG. 19 is a diagram showing images used for the simulation of the operation of the imaging device according to the fourth embodiment. As shown in the diagram, it is assumed that a butterfly object image is moving parallel from left to right in the y direction in a background in which flowers or the like are drawn. FIG. 20 is a diagram showing a signal obtained by the detection unit when the butterfly object image is moving in the background in the simulation of the operation of the imaging device according to the fourth embodiment. FIG. 21 is a diagram showing a signal obtained by the detection unit when there is no butterfly object image in the background in the simulation of the operation of the imaging device according to the fourth embodiment. It is sufficient that this signal of FIG. 21 be prepared in advance. FIG. 22 is a diagram showing a signal obtained by subtracting the signal shown in FIG. 21 from the signal shown in FIG. 20 in the simulation of the operation of the imaging device according to the fourth embodiment. In FIGS. 20 to 22 respectively, the horizontal axes show times, and the vertical axes show pixel locations in the x direction.

Figure 23:
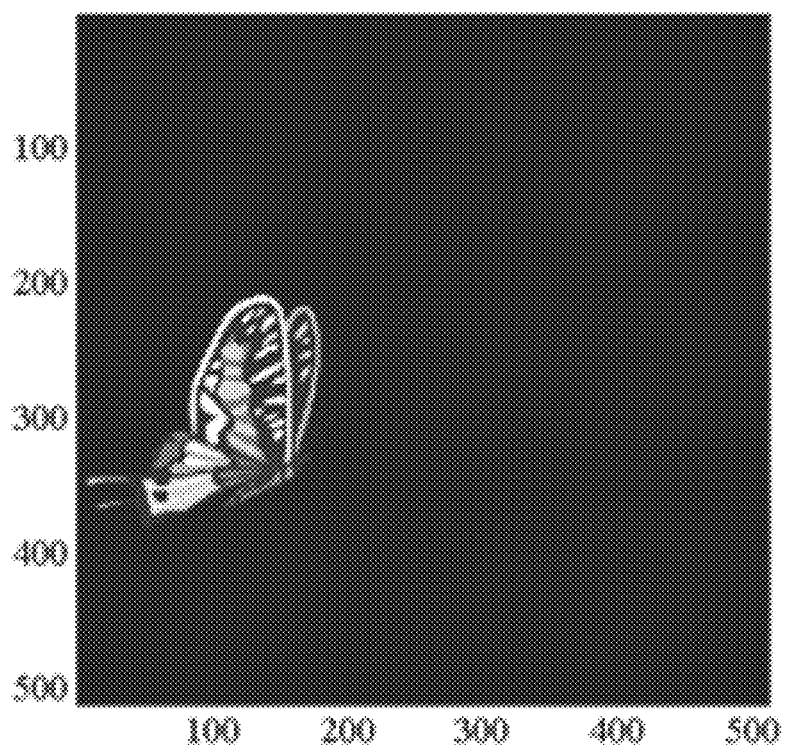
FIG. 23 is a diagram showing an image obtained by the analysis unit on the basis of the signal shown in FIG. 22 in the simulation of the operation of the imaging device according to the fourth embodiment.

FIG. 23 is a diagram showing an image obtained by the analysis unit on the basis of the signal shown in FIG. 22 in the simulation of the operation of the imaging device according to the fourth embodiment. As shown in the diagram, in the present embodiment, because only the moving object 90 is modulated by the pseudo noise code sequences, the background image is removed by demodulation processing by the analysis unit in the same way as the case of the first embodiment, thereby selectively obtaining an image of the object.

Fifth Embodiment

A configuration of an imaging device according to a fifth embodiment is substantially the same as that shown in FIG. 1. However, the imaging device according to the fifth embodiment is characterized in the point that the pseudo noise code sequences $m_n(y)$ with respect to each light receiving cells $d_n$ are different from one another, and the analysis unit analyzes an electric signal sampled every time an output value of one of the N light receiving cells $d_1$ to $d_N$ changes, to obtain the image of the object.

It is possible to sense a movement of the object in the middle of photographing a moving object (that is, while an image is being focused on the light receiving plane of the one-dimensional line sensor) by judging whether or not a difference between the signals output at a time t and a time t+Δt of the one-dimensional line sensor is 0. A time interval of clocks generated on the basis of this differential signal may be utilized as an interval of a delay time in an operation of correlation function at the time of demodulation. With this, a velocity of the moving object is not necessarily known in advance. In other words, there is no need to measure a velocity of the moving object with another means. In Patent Document (Japanese Translation of International Application (Kohyo) No. 2004-506919), another optical system is introduced in order to synchronize a photodetector and a moving object in moving object imaging.

However, in some cases, 0 or 1 may be continuously output according to the property of pseudo noise code sequences. In particular, in the case where a size in the y direction of an image of an object has a length of a pixel of a pseudo noise code sequence mask pattern, a difference between outputs at the time t and the time t+Δt may be 0 in some cases though the object is moving. In such a case, it is recommended to paste masks having different pseudo noise code sequences on the respective light receiving cells. The formula (18) is made such that an M sequence is selected as a pseudo noise code sequence, $m_1=[a_1, a_2, \ldots, a_{N-1}, a_N]$ is set as a basic M sequence, and an M sequence in which the elements of this $m_1$ are cyclic shifted by one element to the left is $m_2$, an M sequence in which the elements of this $m_2$ is cyclic shifted by one element to the left is $m_3$, and in general, an M sequence in which the elements of $m_n$ are cyclic shifted by one element to the left is $m_{n+1}$. This matrix is also called an M sequence type Hadamard matrix.

[Mathematical formula 18]

$$\begin{pmatrix} m_1 \\ \vdots \\ \vdots \\ m_N \end{pmatrix} = \begin{pmatrix} a_1 & a_2 & \ldots & a_{N-1} & a_N \\ a_2 & a_3 & \vdots & a_N & a_1 \\ & & \vdots & & \\ a_{N-1} & a_N & \ldots & a_{N-3} & a_{N-2} \\ a_N & a_1 & & a_{N-2} & a_{N-1} \end{pmatrix} \quad (18)$$

Sixth Embodiment

In the first to fifth respective embodiments described above, the optical system that focuses into an image of an object on the light receiving plane of the detection unit is provided between the object and the light receiving plane of the detection unit.

On the other hand, in the sixth embodiment, no image forming optical system is provided between an object and a light receiving plane of a detection unit, and the object is caused to move on the light receiving plane of the detection unit. In this case, in order to obtain an image of the object at a high resolution by an analysis unit, each pixel in a pseudo noise code sequence mask is preferably formed into a size which is comparable to, or equal to or lower than a resolution required when photographing the object. This is suitable for the case where cells serving as an object are observed on a substrate in a micro TAS (Total Analysis System), a lab-on-a-chip, or the like.

Seventh Embodiment

Figure 24:
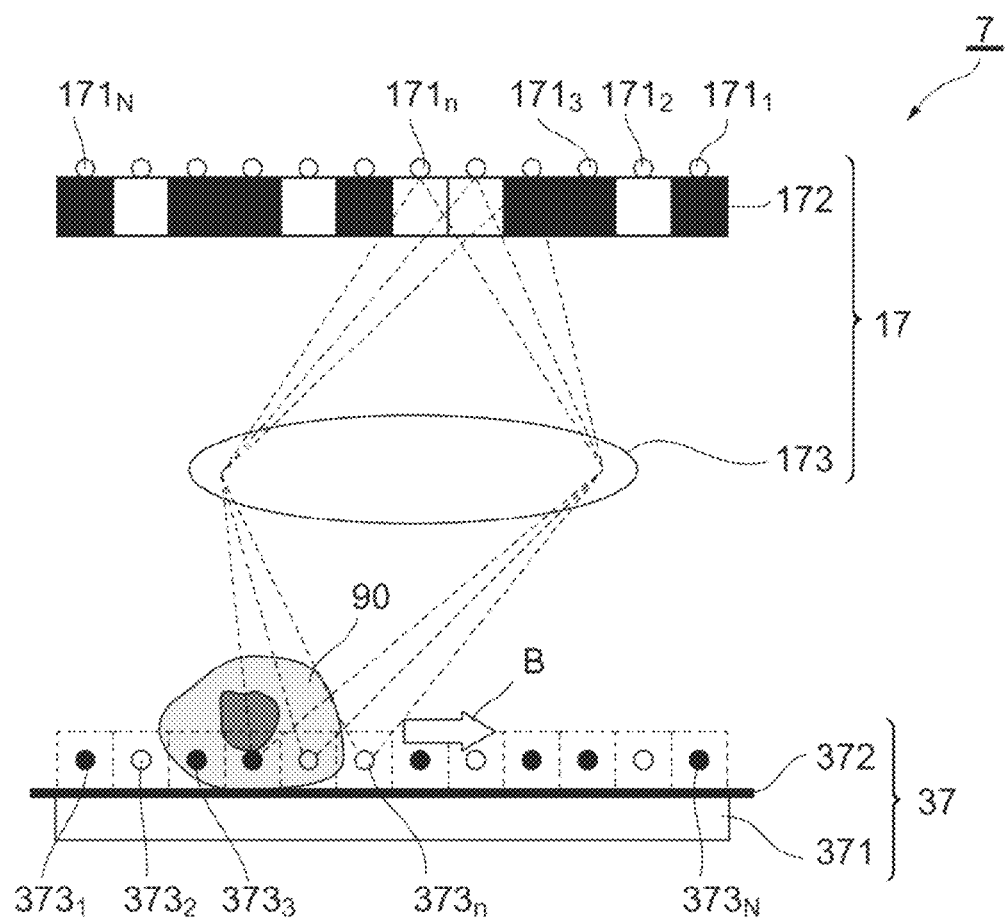
FIG. 24 is a diagram showing a configuration of an imaging device 7 according to a seventh embodiment.

FIG. 24 is a diagram showing a configuration of an imaging device 7 according to a seventh embodiment. The imaging device 7 includes an illumination unit 17 that irradiates the moving object 90 with light, a detection unit 37 in which the object 90 moves on its light receiving plane, and an analysis unit which analyzes a detected result by the detection unit 37, to obtain an image of the object 90.

The illumination unit 17 irradiates the object 90 with light in a lighting pattern corresponding to the pseudo noise code sequences along a direction corresponding to the y direction. The illumination unit 17 includes point light sources $171_1$ to $171_K$, a mask 172, and an optical system 173. The mask 172 has a pattern of transmission and blocking corresponding to a pseudo noise code sequence with a period K, and allows light of a point light source $171_k$ corresponding to a transmission portion in the pattern to transmit through it toward the optical system 173. The optical system 173 focuses into an image of the light output from the transmission portion of the mask 172 on a light receiving plane of the detection unit 37. As a result, a lighting pattern according to the pseudo noise code sequence is formed along the y direction of the light receiving cells, on the light receiving plane of the detection unit 37. In addition, even if the mask 172 is not used, by setting whether the point light sources $171_1$ to $171_K$ are lighted or unlighted in accordance with the pattern corresponding to the pseudo noise code sequence in the mask 172, it is possible to realize lighting patterns $373_1$ to $373_N$ according to the pseudo noise code sequence, on the light receiving plane of the detection unit 37.

The object 90 moving on the light receiving plane of the detection unit 37 is labeled with a fluorescent dye which absorbs one or more photons to yield fluorescence. The object 90 is irradiated with light from the point light source $171_k$, to be excited to yield fluorescence. The detection unit 37 includes a one-dimensional line sensor 371 and an optical filter 372. The optical filter 372 allows the fluorescence yielded from the object 90 to transmit through it toward the one-dimensional line sensor 371, and blocks the excitation light. The one-dimensional line sensor 371 receives the light transmitting through the optical filter 372, and outputs an electric signal corresponding to an amount of the received light to the analysis unit. The one-dimensional line sensor 371 in the seventh embodiment is the same as the one-dimensional line sensor 311 in the first embodiment, and a plurality of light receiving cells are arrayed in a direction vertical to a plane of paper. The analysis unit in the seventh embodiment performs processing which is the same as that by the analysis unit in the first embodiment, to be able to obtain a still image of the moving object 90.

This imaging device 7 according to the seventh embodiment is configured to cause the object 90 to move on the light receiving plane of the detection unit 37 in the same way as the case of the sixth embodiment. Therefore, the imaging device 7 according to the seventh embodiment is suitable for the case where cells serving as an object are observed on a substrate in a micro TAS, a lab-on-a-chip, or the like.

In addition, the point light sources $171_1$ to $171_K$ may be spatial point light sources. Further, light sources serving as temporal point light sources (refer to temporal focusing technology, Dan Oran, "Scanningless depth-resolved microscopy," Opt. Exp. 13, 1468, (2005).) may be prepared.

Eighth Embodiment

A configuration of an imaging device according to an eighth embodiment is substantially the same as that shown in FIG. 1. However, the imaging device according to the eighth embodiment is characterized in the point that a mask used along with a one-dimensional line sensor in a detection unit has a transmissivity distribution based on chirp signals.

Figure 25:
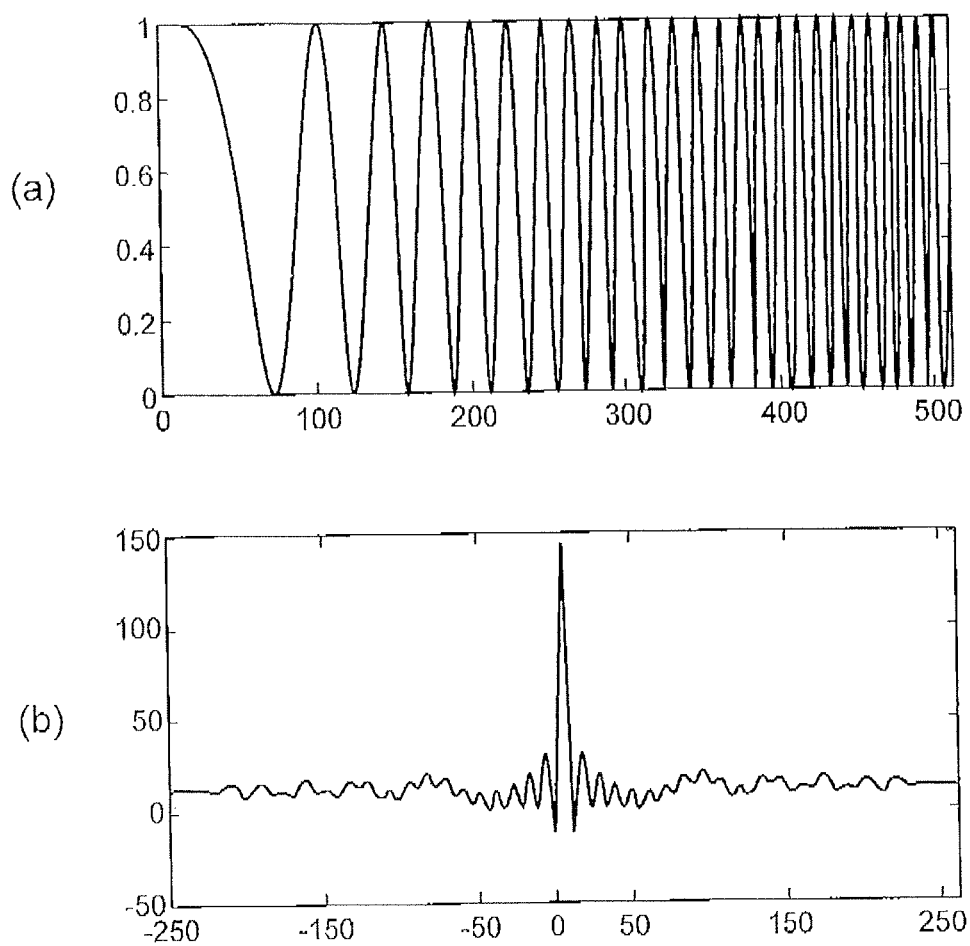
FIG. 25 is a diagram for explanation of the transmissivity distributions based on chirp signals in a mask of an imaging device according to an eighth embodiment.

FIG. 25 is a diagram for explanation of the transmissivity distributions based on chirp signals in a mask of the imaging device according to the eighth embodiment. As chirp signals, for example, a waveform called Time Stretched Pulse (hereinafter called "TSP") in which a phase changes in proportion to the square of a frequency is used (refer to, for example, the document 'Aoshima Nobuharu, "Personal computer based signal compression method applied for a measurement of sound field in a pipe", Acoustical Science and Technology, 40, 146-151, 1984').

Part (a) of FIG. 25 shows a waveform of a TSP. In the drawing, the horizontal axis denotes the spatial direction (Y direction), and the vertical axis denotes the transmittances in a range from 0 to 1. That is, masks which allow light to transmit through those within the transmittances from 0% to 100% while a frequency gradually changes in the spatial direction are pasted on the respective light receiving cells of the one-dimensional line sensor. Part (b) of FIG. 25 shows an auto-correlation function of the TSP. In this way, the auto-correlation function of the TSP has an acute peak as a correlation value when an amount of delay is 0. In addition, the center of the horizontal axis of the graph shows the amount of delay τ=0. That is, the auto-correlation function of the TSP corresponds to that an auto-correlation function $R_{mm}'(\tau)$ of the pseudo noise code sequence becomes 0 except for 0 shift.

Figure 26:
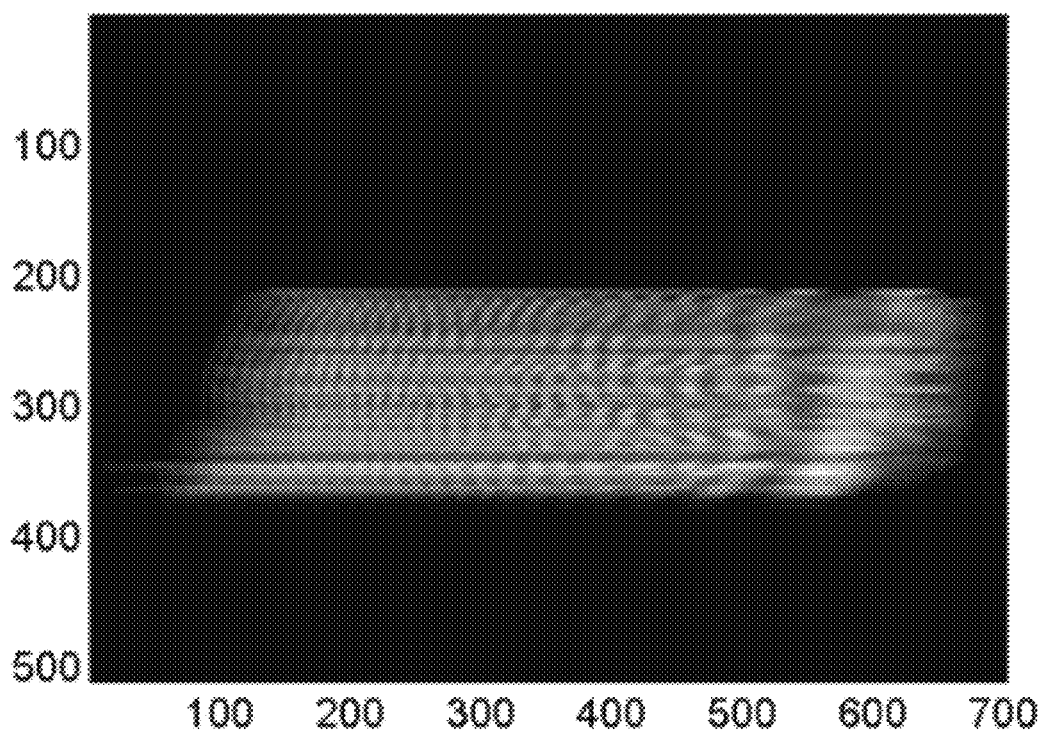
FIG. 26 is a diagram showing a signal obtained by a detection unit in the simulation of the operation of the imaging device according to the eighth embodiment.
Figure 27:
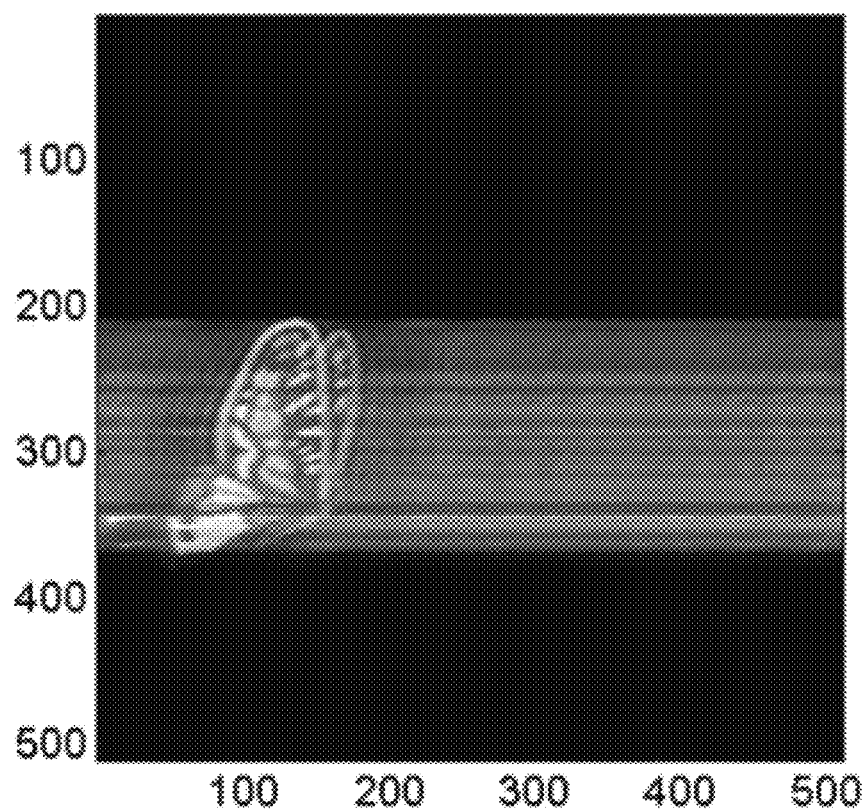
FIG. 27 is a diagram showing an image obtained by an analysis unit in the simulation of the operation of the imaging device according to the eighth embodiment.

Next, a simulation of the operation of the imaging device according to the eighth embodiment will be described. An image used for the simulation of the operation of the imaging device according to the eighth embodiment is the same as that of FIG. 16. FIG. 26 is a diagram showing a signal obtained by the detection unit in the simulation of the operation of the imaging device according to the eighth embodiment. In the diagram, the horizontal axis shows times, and the vertical axis shows pixel locations in the x direction. FIG. 27 is a diagram showing an image obtained by the analysis unit in the simulation of the operation of the imaging device according to the eighth embodiment. As shown in the diagram, in the present embodiment as well, it is possible to obtain an image of the object as a still image even in the case where an object is moving at a high velocity.

Ninth Embodiment

Figure 28:
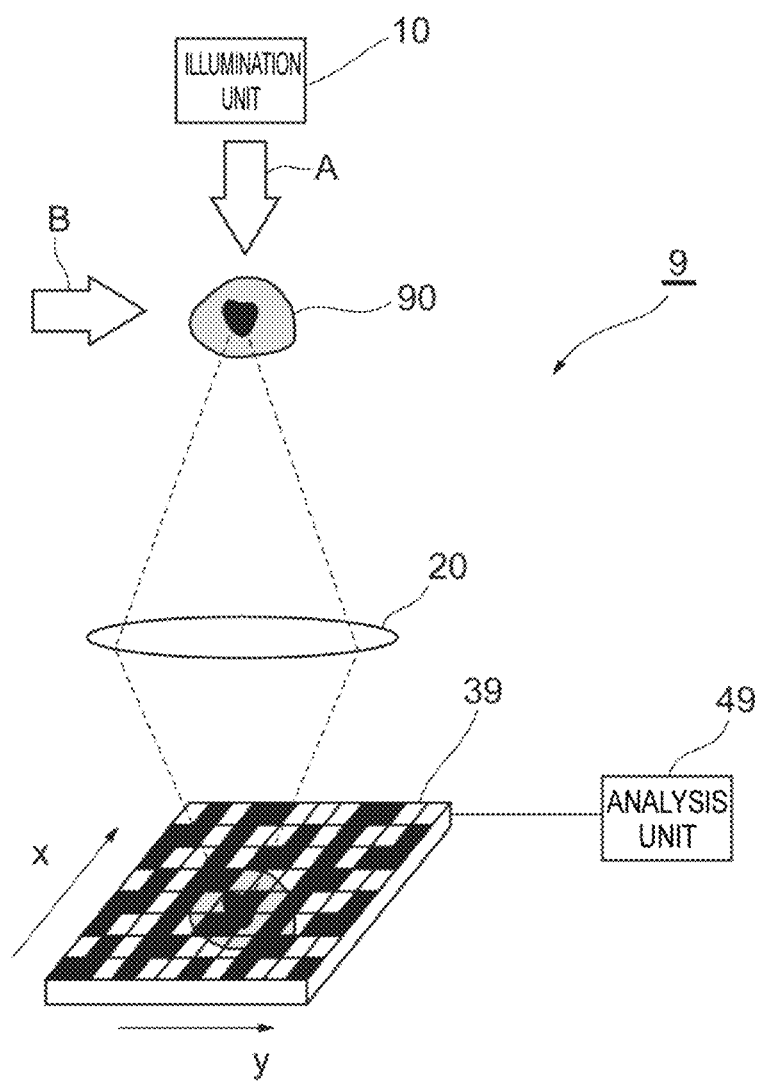
FIG. 28 is a diagram showing a configuration of an imaging device 9 according to a ninth embodiment.
Figure 29:
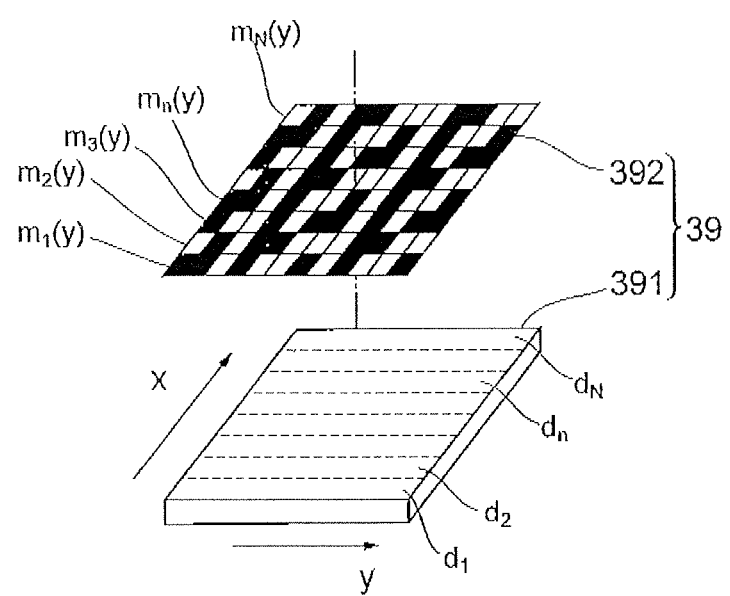
FIG. 29 is a diagram for explanation of a configuration of a detection unit 39 of the imaging device 9 according to the ninth embodiment.

FIG. 28 is a diagram showing a configuration of an imaging device 9 according to a ninth embodiment. The imaging device 9 includes an illumination unit 10 that irradiates the moving object 90 with light A, an optical system 20 that focuses into an image of the object 90, a detection unit 39 having a light receiving plane on which the image of the object 90 by the optical system 20 is formed, and an analysis unit 49 which analyzes a detected result by the detection unit 39, to obtain an image of the object 90. FIG. 29 is a diagram for explanation of a configuration of the detection unit 39 of the imaging device 9 according to the ninth embodiment. The illumination unit 10 and the optical system 20 in the ninth embodiment are the same as those in the case of the first embodiment.

The detection unit 39 includes a plurality of light receiving regions $d_1$ to $d_N$ which are arrayed in the first direction (x direction) on its light receiving plane. These light receiving regions $d_1$ to $d_N$ are merely conveniently differentiated, and compose one light receiving cell as a whole, to output an electric signal corresponding to a total amount of light received. The detection unit 39 is disposed such, that an image moves in a direction parallel to the second direction (y direction) on the light receiving plane according to a movement of the object 90 in the direction B. The first direction (x direction) and the second direction (y direction) are perpendicular to one another. The detection unit 39 receives light or does not receive light according to pseudo noise code sequences along the second direction (y direction) respectively on the plurality of light receiving regions $d_1$ to $d_N$. Two arbitrary pseudo noise code sequences among the pseudo noise code sequences respectively on the plurality of light receiving regions $d_1$ to $d_N$ are substantially perpendicular to one another. In addition, the code sequences in which a cross-correlation function of the two pseudo noise code sequences is 0 shift and 0 except for 0 shift are called being substantially perpendicular to one another. The detection unit 39 outputs an electric signal corresponding to a total amount of light received on the plurality of light receiving regions $d_1$ to $d_N$.

The detection unit 39 is configured by pasting a mask 392 on a light receiving plane of a sensor 391. In the sensor 391, N light receiving regions $d_1$ to $d_N$ are arrayed in the x direction. Each light receiving region $d_n$ is long in the y direction, or may be regarded as being long via an optical system. In the mask 392, N pseudo noise code sequence masks $m_1(y)$ to $m_n(y)$ are arrayed in the x direction. Each pseudo noise code sequence mask $m_n(y)$ is disposed on a corresponding light receiving region $d_n$, to transmit or block light according to pseudo noise code sequences along the y direction. In the respective FIGS. 28 and 29, one of transmission and blocking of light at the mask 392 is shown in black, and the other one is shown in white. Two arbitrary pseudo noise code sequence $m_{n1}(y)$ and pseudo noise code sequence $m_{n2}(y)$ are substantially perpendicular to one another.

The analysis unit 49 analyzes the electric signal output from the detection unit 39, to obtain an image of the object. Hereinafter, the N pseudo noise code sequences $m_1(y)$ to $m_n(y)$ and the processing content of the analysis unit 49 will be further described.

A code most appropriate as a spread code used for a CDMA technology in the communications field among the pseudo noise code sequences is a code in which an auto-correlation function has an acute peak (i.e., a Kronecker delta function) when a phase difference is 0, an auto-correlation function is 0 when a phase difference is not 0, and a cross-correlation function of two arbitrary sequences is 0 shift and 0 except for 0 shift. That is, the following formula (19) must be made. In the formula (19), a matrix B denotes a unit matrix, and a matrix 0 denotes a matrix whose elements are all 0 values. α denotes a constant. However, a symbol M in the formula (19) is, as shown by the formula (18), a matrix in which a certain pseudo noise code sequence is set to $m_i$, and which has sequences in which the elements thereof are sequentially cyclic shifted one by one as rows. Further, a matrix $M'_i$ is a matrix in which a pseudo noise code sequence whose correlation function becomes 0 except for 0 shift is set to $m'_i$ with respect to the pseudo noise code sequence $m_i$, and which has sequences in which the elements thereof are sequentially cyclic shifted one by one as rows.

[Mathematical formula 19]

$$M_i'^T M_j = \begin{cases} \alpha E & (i = j) \\ O & (i \neq j) \end{cases} \quad (19)$$

A spread code satisfying this formula (19) is most appropriate. When it is possible to selectively use such a pseudo noise code sequence, an output signal I from the sensor 391 is expressed by the following formula (20). In order to extract a signal $r_{dn}$ of the light receiving region $d_n$ from the time-series signal I shown in the formula (20), it is recommended to apply a transposed matrix of the matrix $M'_n$ to the formula (20), so as to be the following formula (21). Resultantly, the signal $r_{dn}$ is an image ($h_n$) focused on the region $d_n$ of the light receiving plane.

[Mathematical formula 20]

$$I = \sum_{i=1}^{N} I_{di} \quad (20)$$
$$= \sum_{i=1}^{N} M_i h_i$$

[Mathematical formula 21]

$$r_{dn} = M_n'^T \sum_{i=1}^{N} M_i h_i \quad (21)$$
$$= \alpha E h_n$$

In the present embodiment, N pseudo noise code sequences $m_i$ (i=1 to N) satisfying the formula (19) are prepared, and the mask 392 in which those are two-dimensionally disposed is pasted on the light receiving plane of the single-pixel sensor 391. In addition, it has been known that there is no spread code exactly satisfying the formula (19). Meanwhile, various sequences nearly satisfying the formula (19) have been devised.

Figure 30:
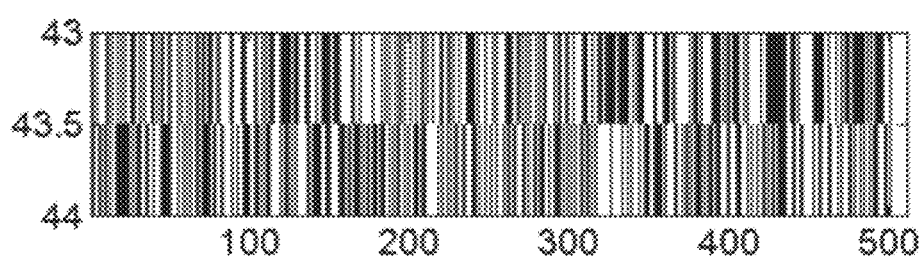
FIG. 30 is a diagram showing a two-dimensional pattern of a mask 392 used for the simulation of the operation of the imaging device 9 according to the ninth embodiment.

Next, a simulation of the operation of the imaging device 9 according to the ninth embodiment will be described. Here, the simulation has been carried out by use of a pseudo-orthogonal M sequence pair that is the simplest sequence. FIG. 30 is a diagram showing a two-dimensional pattern of the mask 392 used for the simulation of the operation of the imaging device 9 according to the ninth embodiment. The diagram is facilitated in visualization by extending the pattern in the x direction. The M sequences with a period K=511 which are generated from two different primitive functions are respectively set to $m_1$ and $m_2$. Each element in these M sequences $m_1$ and $m_2$ is a code of 0 or 1. The mask 392 in which 0 is for blocking of light and 1 is for transmission of light is pasted on the single-pixel (for example, 20 μm in the x direction and 5110 μm in the y direction (=10×511)) sensor 391. The object 90 is to move in the y direction. A mask pixel of 0 or 1 is 10×10 μm.

Figure 31:
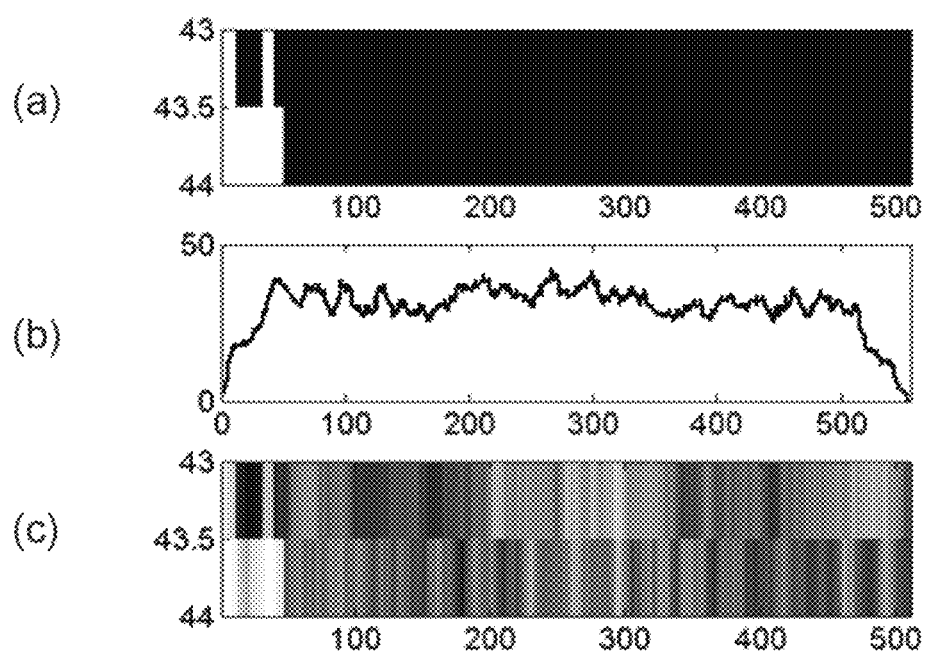
FIG. 31 is a diagram showing respective signals in the simulation of the operation of the imaging device 9 according to the ninth embodiment.

FIG. 31 is a diagram showing respective signals in the simulation of the operation of the imaging device 9 according to the ninth embodiment. Part (a) of FIG. 31 shows an image used for the simulation. It is assumed that a white-shaped object is moving parallel from left to right in the y direction in a uniform black background. Part (b) of FIG. 31 shows a signal obtained by the detection unit 39 in the simulation. In the diagram, the horizontal axis shows times, and the vertical axis shows the output signal I from the sensor 391 shown in the formula (20). Part (c) of FIG. 31 shows an image obtained by the analysis unit 49 in the simulation. The $M_i$ and $M'_i$ used at this time are matrixes having sequences in which the elements of the pseudo-orthogonal M sequence pairs $m_i$ and $m'_i$ are respectively sequentially cyclic shifted one by one, as rows as in the formula (18) in the same way as the case of the first embodiment.

As described above, the imaging device 9 according to the present embodiment is capable of obtaining a still image of a moving object by use of a single-pixel sensor. The imaging device 9 according to the present embodiment is not to generate pseudo noise code sequences as a time-series signal, but has a pseudo noise code sequence mask fixed onto the light receiving plane of the single-pixel sensor. Accordingly, the imaging device 9 according to the present embodiment is capable of obtaining a still image of the object even in the case where an object is moving at a high velocity.

In addition, as the second to eighth respective embodiments are available as modified examples of the first embodiment, a similar modified example is possible with respect to the ninth embodiment.

Tenth Embodiment

In general, auto-correlation functions are differentiated into periodic auto-correlation functions and aperiodic auto-correlation functions. In the first to ninth respective embodiments, M sequences and the other code sequences having the property that their periodic auto-correlation functions all become 0 except for 0 shift are used. In the tenth embodiment, an example in which a self-complementary sequence which is a code sequence in which aperiodic auto-correlation functions all become 0 except for 0 shift are used is used is shown.

For example, as a self-complementary sequence, the sequence series expressed by the following formulas (22) and (23) have been known. The aperiodic auto-correlation function of $m_1$ is expressed by the following formula (24), and the aperiodic auto-correlation function of $m_2$ is expressed by the following formula (25), and the both do not become 0 except for 0 shift. However, the respective aperiodic auto-correlation functions are summed up, to become the following formula (26), that has the property that the function all becomes 0 except for 0 shift.

[Mathematical formula 22]

$$m_1 = \{1\ 1\ 1\ -1\ 1\ 1\ -1\ 1\} \quad (22)$$

[Mathematical formula 23]

$$m_2 = \{1\ -1\ 1\ 1\ 1\ -1\ -1\ -1\} \quad (23)$$

[Mathematical formula 24]

$$\{1\ 0\ 1\ 0\ 3\ 0\ -1\ 8\ -1\ 0\ 3\ 0\ 1\ 0\ 1\} \quad (24)$$

[Mathematical formula 25]

$$\{-1\ 0\ -1\ 0\ -3\ 0\ 1\ 8\ 1\ 0\ -3\ 0\ -1\ 0\ -1\} \quad (25)$$

[Mathematical formula 26]

$$\{0\ 0\ 0\ 0\ 0\ 0\ 0\ 16\ 0\ 0\ 0\ 0\ 0\ 0\ 0\} \quad (26)$$

Now, a matrix $M_1$ having sequences in which the elements of the $m_1$ are sequentially acyclic shifted one by one as rows (the following formula (27)) is prepared. In addition, as shown in the formula (27), elements other than the elements of $m_1$ are filled with 0. A matrix product with the matrix in which this matrix $M_1$ is transposed is expressed by the following formula (28).

[Mathematical formula 27]

$$M_1 = \begin{pmatrix} 0 & 0 & 0 & 0 & 0 & 0 & 0 & 1 \\ 0 & & & & & 0 & 1 & 1 \\ 0 & & & & 0 & 1 & 1 & 1 \\ 0 & & & 0 & 1 & 1 & 1 & -1 \\ 0 & & 0 & 1 & 1 & 1 & -1 & 1 \\ 0 & 0 & 1 & 1 & 1 & -1 & 1 & 1 \\ 0 & 1 & 1 & 1 & -1 & 1 & 1 & -1 \\ 1 & 1 & 1 & -1 & 1 & 1 & -1 & 1 \\ 1 & 1 & -1 & 1 & 1 & -1 & 1 & 0 \\ 1 & -1 & 1 & 1 & -1 & 1 & 0 & \\ -1 & 1 & 1 & -1 & 1 & 0 & & \\ 1 & 1 & -1 & 1 & 0 & & & \\ 1 & -1 & 1 & 0 & & & & \\ -1 & 1 & 0 & & & & & \\ 1 & 0 & 0 & 0 & 0 & 0 & 0 & 0 \end{pmatrix} \quad (27)$$

[Mathematical formula 28]

$$M_1^T M_1 = \begin{pmatrix} 8 & -1 & 0 & 3 & 0 & 1 & 0 & 1 \\ -1 & 8 & -1 & 0 & 3 & 0 & 1 & 0 \\ 0 & -1 & 8 & -1 & 0 & 3 & 0 & 1 \\ 3 & 0 & -1 & 8 & -1 & 0 & 3 & 0 \\ 0 & 3 & 0 & -1 & 8 & -1 & 0 & 3 \\ 1 & 0 & 3 & 0 & -1 & 8 & -1 & 0 \\ 0 & 1 & 0 & 3 & 0 & -1 & 8 & -1 \\ 1 & 0 & 1 & 0 & 3 & 0 & -1 & 8 \end{pmatrix} \quad (28)$$

In the same way, a matrix $M_2$ is prepared with respect to the sequence series $m_2$ shown in the formula (23), to obtain the following formulas (29) and (30).

[Mathematical formula 29]

$$M_2 = \begin{pmatrix} 0 & 0 & 0 & 0 & 0 & 0 & 0 & 1 \\ 0 & & & & & 0 & 1 & -1 \\ 0 & & & & 0 & 1 & -1 & 1 \\ 0 & & & 0 & 1 & -1 & 1 & 1 \\ 0 & & 0 & 1 & -1 & 1 & 1 & 1 \\ 0 & 0 & 1 & -1 & 1 & 1 & 1 & -1 \\ 0 & 1 & -1 & 1 & 1 & 1 & -1 & -1 \\ 1 & -1 & 1 & 1 & 1 & -1 & -1 & -1 \\ -1 & 1 & 1 & 1 & -1 & -1 & -1 & 0 \\ 1 & 1 & 1 & -1 & -1 & -1 & 0 & 0 \\ 1 & 1 & -1 & -1 & -1 & 0 & & 0 \\ 1 & -1 & -1 & -1 & 0 & & & 0 \\ -1 & -1 & -1 & 0 & & & & 0 \\ -1 & -1 & 0 & & & & & 0 \\ -1 & 0 & 0 & 0 & 0 & 0 & 0 & 0 \end{pmatrix} \quad (29)$$

[Mathematical formula 30]

$$M_2^T M_2 = \begin{pmatrix} 8 & 1 & 0 & -3 & 0 & -1 & 0 & -1 \\ 1 & 8 & 1 & 0 & -3 & 0 & -1 & 0 \\ 0 & 1 & 8 & 1 & 0 & -3 & 0 & -1 \\ -3 & 0 & 1 & 8 & 1 & 0 & -3 & 0 \\ 0 & -3 & 0 & 1 & 8 & 1 & 0 & -3 \\ -1 & 0 & -3 & 0 & 1 & 8 & 1 & 0 \\ 0 & -1 & 0 & -3 & 0 & 1 & 8 & 1 \\ -1 & 0 & -1 & 0 & -3 & 0 & 1 & 8 \end{pmatrix} \quad (30)$$

Resultantly, a sum of the aperiodic auto-correlation functions of $m_1$ and $m_2$ becomes 0 except for 0 shift as shown in the following formula (31).

[Mathematical formula 31]

$$M_1^T M_1 + M_2^T M_2 = \begin{pmatrix} 16 & 0 & 0 & 0 & 0 & 0 & 0 & 0 \\ 0 & 16 & 0 & 0 & 0 & 0 & 0 & 0 \\ 0 & 0 & 16 & 0 & 0 & 0 & 0 & 0 \\ 0 & 0 & 0 & 16 & 0 & 0 & 0 & 0 \\ 0 & 0 & 0 & 0 & 16 & 0 & 0 & 0 \\ 0 & 0 & 0 & 0 & 0 & 16 & 0 & 0 \\ 0 & 0 & 0 & 0 & 0 & 0 & 16 & 0 \\ 0 & 0 & 0 & 0 & 0 & 0 & 0 & 16 \end{pmatrix} \quad (31)$$

Figure 33:
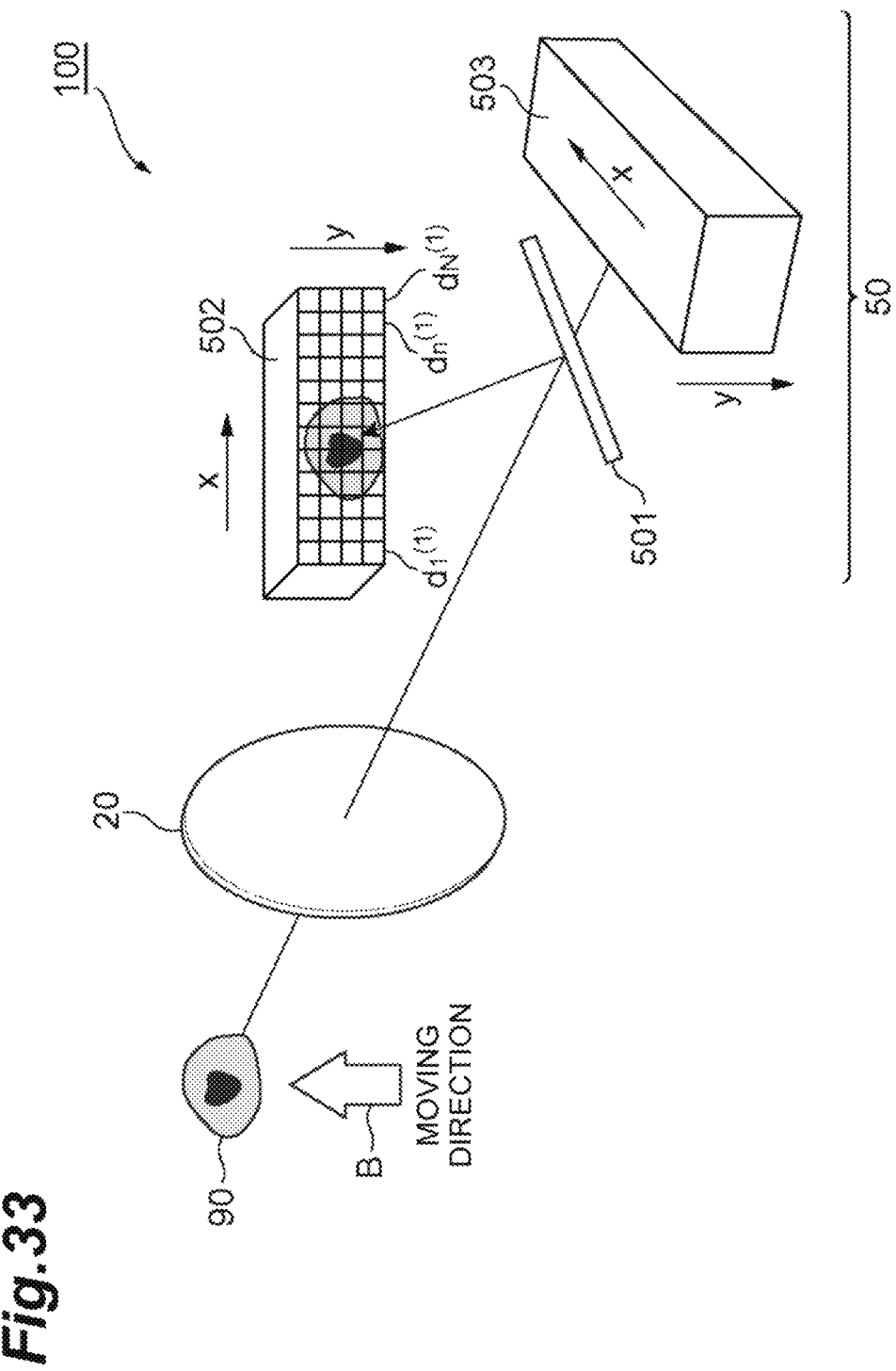
FIG. 33 is a diagram showing a configuration of an imaging device 100 according to a tenth embodiment.

The imaging device according to the tenth embodiment utilizes such code sequences. FIG. 33 is a diagram showing a configuration of an imaging device 100 according to the tenth embodiment. The imaging device 100 includes an illumination unit that irradiates the moving object 90 with light, an optical system 20 that focuses into an image of the object 90, a detection unit 50 having a light receiving plane on which the image of the object 90 by this optical system 20 is formed, and an analysis unit which analyzes a detected result by the detection unit 50, to obtain an image of the object 90. FIG. 34 are diagrams for explanation of a partial configuration of the detection unit 50 of the imaging device 100 according to the tenth embodiment. These diagrams mainly show the configuration of the detection unit 50 of the imaging device 100 according to the tenth embodiment.

The detection unit 50 includes a half mirror 501, a two-dimensional sensor 502, a two-dimensional sensor 503, an adder 504$_n$, an adder 505$_n$, a subtractor 506$_n$, an adder $507_n$, an adder $508_n$, and a subtractor $509_n$. The optical system 20 focuses into an image of light from the object 90 on the respective light receiving planes of the two-dimensional sensor 502 and the two-dimensional sensor 503. The half mirror 501 bifurcates the light from the optical system 20 into two, and outputs one bifurcated light to the two-dimensional sensor 502, and outputs the other bifurcated light to the two-dimensional sensor 503.

In the present embodiment, a fixed mask pattern according to a pseudo noise code sequence is not used. Instead, the pixels are electrically connected to one another in accordance with the self-complementary sequence $m_1$ shown by the formula (22) in the Y direction of the light receiving plane of the two-dimensional sensor 502, and a linear convolution integral of the self-complementary sequence $m_1$ and an image is expressed by the following formula (32). Further, the pixels are electrically connected to one another in accordance with the self-complementary sequence $m_2$ shown by the formula (23) in the Y direction of the light receiving plane of the two-dimensional sensor 503, and a linear convolution integral of the self-complementary sequence $m_2$ and an image is expressed by the following formula (33). In order to obtain an image without motion blur from outputs $I_{dn}^{(1)}$ and $I_{dn}^{(2)}$ of respective pixel arrays $d_n^{(1)}$ and $d_n^{(2)}$ of the two-dimensional sensors 502 and 503, it is sufficient to sum up those in which the transposed matrixes of $M_1$ and $M_2$ are respectively applied from the left to the formula (32) and the formula (33), to obtain the following formula (34). For example, each element $I_k^{(1)}$ of a vector in the middle side in the formula (32) is an output value at a time k of the two-dimensional sensor 502. In the same way, each element $I_k^{(2)}$ in the middle side in the formula (33) is an output value at a time k of the two-dimensional sensor 503.

[Mathematical formula 32]

$$I_{dn}^{(1)} = (I_1^{(1)}\ I_2^{(1)} \ldots I_K^{(1)})^T = M_1 h \quad (32)$$

[Mathematical formula 32]

$$I_{dn}^{(2)} = (I_1^{(2)}\ I_2^{(2)} \ldots I_K^{(2)})^T = M_2 h \quad (33)$$

[Mathematical formula 34]

$$r_{dn} = (r_1\ r_2 \ldots r_K)^T = (M_1^T M_1 + M_2^T M_2)h = 16Eh \quad (34)$$

Part (a) of FIG. 34 shows the pixel arrays $d_n^{(1)}$ arrayed in the Y direction at a position X at which the two-dimensional sensor 502 is placed. The pixel arrays $d_n^{(1)}$ have a pixel structure in the Y direction, and the pixels are connected to the adder $504_n$ or the adder $505_n$ with the outputs of the pixels in accordance with the self-complementary sequence $m_1$ shown in the formula (22). That is, the respective pixels corresponding to the elements +1 of the $m_1$ are connected to the adder $504_n$, and a sum of these outputs is output from the adder $504_n$. At the same time, the respective pixels corresponding to the elements −1 of the $m_1$ are connected to the adder $505_n$, and a sum of these outputs is output from the adder $505_n$. Then, a difference between the outputs from the adder $504_n$ and the adder $505_n$ is found by the subtractor $506_n$. That is, the light receiving plane of the two-dimensional sensor 502 has a two-dimensional pixel structure, meanwhile, the two-dimensional sensor 502 outputs a signal of a value corresponding to the total intensity of light received by the respective pixel arrays $d_n^{(1)}$ due to the electrical connection at the subsequent stage.

Part (b) of FIG. 34 shows the pixel arrays $d_n^{(2)}$ arrayed in the Y direction at a position X at which the two-dimensional sensor 503 is placed. The pixel arrays $d_n^{(2)}$ have a pixel structure in the Y direction, and the pixels are connected to the adder $507_n$ or the adder $508_n$ with the outputs of the pixels in accordance with the self-complementary sequence $m_2$ shown in the formula (23). That is, the respective pixels corresponding to the elements +1 of the $m_2$ are connected to the adder $507n$, and a sum of these outputs is output from the adder $507_n$. At the same time, the respective pixels corresponding to the elements −1 of the $m_2$ are connected to the adder $508_n$, and a sum of these outputs is output from the adder $508_n$. Then, a difference between the outputs from the adder $507_n$ and the adder $508_n$ is found by the subtractor $509_n$. That is, the light receiving plane of the two-dimensional sensor 503 has a two-dimensional pixel structure, meanwhile, the two-dimensional sensor 503 outputs a signal of a value corresponding to the total intensity of light received by the respective pixel arrays $d_n^{(2)}$ due to the electrical connection at the subsequent stage.

Figure 35:
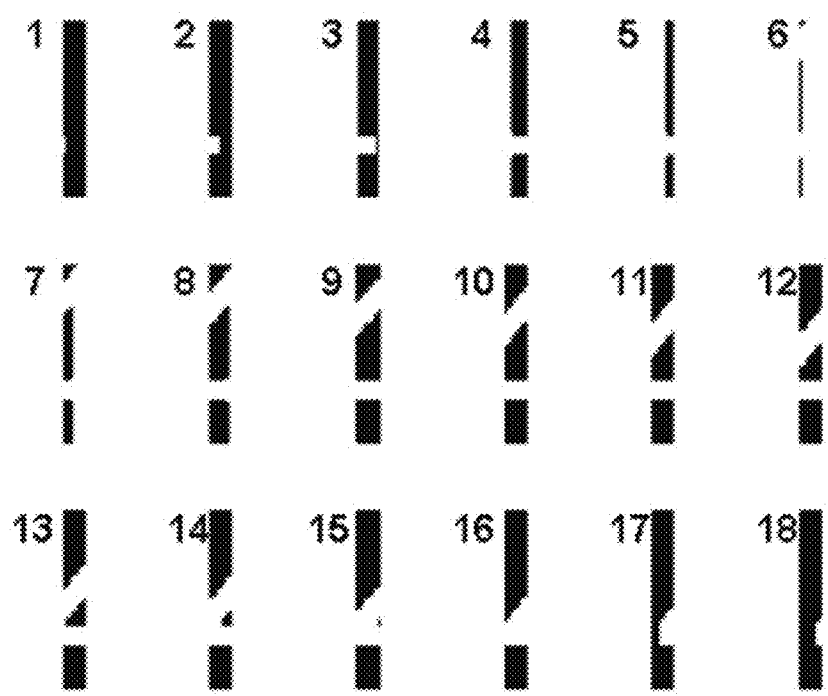
FIG. 35 is a diagram showing images used for the simulation of the operation of the imaging device 100 according to the tenth embodiment.

Next, a simulation of the operation of the imaging device 100 according to the tenth embodiment will be described. FIG. 35 is a diagram showing images which have been used for the simulation of the operation of the imaging device 100 according to the tenth embodiment. It is assumed that an outline character "4" moves, in the order of the numbers shown in the drawing, parallel from left to right in the y direction in a uniform black background. A size of the image of the character on the light receiving plane of the detection unit 50 is 66 pixels in the x direction and 8 pixels in the y direction. The visual field F and a moving object group G do not satisfy the relationship of G<F.

Figure 37:
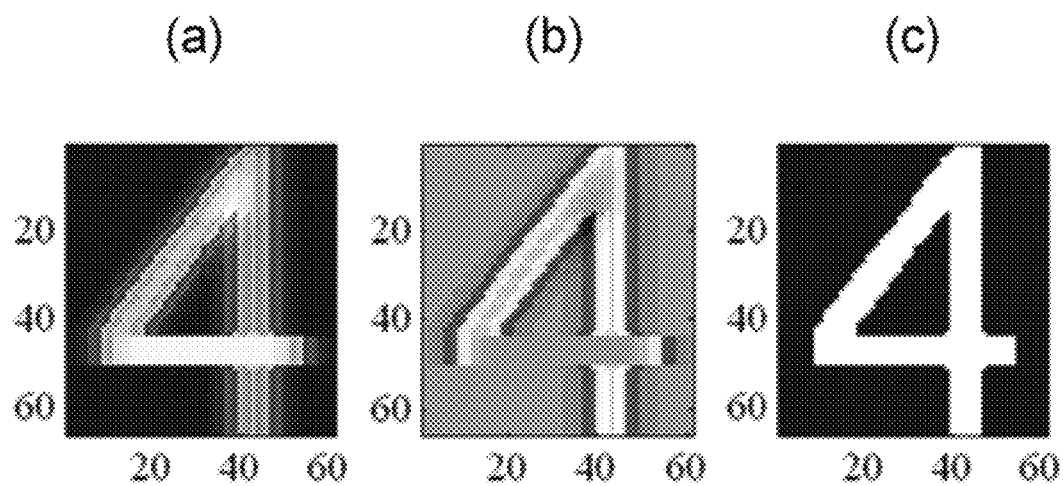
FIG. 37 is a diagram showing images obtained by an analysis unit in the simulation of the operation of the imaging device 100 according to the tenth embodiment.

FIG. 36 is a diagram showing signals obtained by the detection unit 50 in the simulation of the operation of the imaging device 100 according to the tenth embodiment. Part (a) of FIG. 36 is output data from the one two-dimensional sensor 502, and Part (b) of FIG. 36 is output data from the other two-dimensional sensor 503. FIG. 37 is a diagram showing images obtained by an analysis unit in the simulation of the operation of the imaging device 100 according to the tenth embodiment. Part (a) of FIG. 37 is a result of the operation of $M_1^T M_1 h$, Part (b) of FIG. 37 is a result of the operation of $M_2^T M_2 h$, and Part (c) of FIG. 37 is a result of the operation of the above-described formula (34).

In the tenth embodiment as well, it is possible to obtain an image of the object as a still image even in the case where an object is moving at a high velocity. Further, because almost all the light reaching the detection unit 50 is received by the two-dimensional sensor 502 or the two-dimensional sensor 503, in the tenth embodiment, it is possible to take an image with an amount of light twice that in the case according to the first embodiment.

In the respective embodiments described above, except for the sixth embodiment and the seventh embodiment, the optical system that focuses into an image of an object is provided, and the image of the object by this optical system is formed on a light receiving plane of a detection unit. In addition to this optical system, or in place of this optical system, the imaging devices according to the respective embodiments may include an optical component which emits an image of an object incident into one end face, from the other end face. The optical component emits an image of an object from the other end face, thereby forming the image of the object on the light receiving plane of the detector, and for example, it is an image fiber, a fiber optic taper (Fiber Optic Tapers; FOT) in which an image fiber is formed into a tapered shape, or the like. In the case where such an optical component is combined with an optical system such as a lens, it is recommended that the optical system focus into an image of an object on one end face of the optical component.

In addition, in some cases, an image fiber may be called various names such as a fiber optic plate, an image conduit, or an image fiber bundle. Further, a fiber optic taper is capable of magnifying/reducing an image incident into its one end by predetermined magnifications, to transmit the image to the other end. For example, an image of an object incident from an end face on the larger diameter side of the both end faces of a fiber optic taper is reduced at an end face on the smaller diameter side, to be emitted.

By utilizing, for example, a fiber optic taper as an optical component, it is possible to obtain the following effects. That is, an image directly obtained from an object or an image of the object obtained via an optical system is made incident into an end face on the larger diameter side of the fiber optic taper, and an image emitted from an end face on the smaller diameter side is guided to the light receiving plane of a photodetector, thereby it is possible to utilize the photodetector having a smaller light receiving area. In general, the smaller the light receiving area is, the better the frequency response of the photodetector is. Therefore, by utilizing a fiber optic taper, it is possible to take an image of an object at a faster moving velocity. Further, even in the case where a pixel size of the light receiving plane of the photodetector is large, by utilizing a fiber bundle or a fiber optic taper as an optical component, it is possible to obtain a sufficient spatial resolution, which makes it possible to obtain an image at the same level as that in the case where a pixel size of the light receiving plane of the photodetector is small.

INDUSTRIAL APPLICABILITY

The present invention is applicable as an imaging device which is capable of obtaining an image of the object as a still image even in the case where an object is moving at a high velocity.

REFERENCE SIGNS LIST 1 to 9 . . . Imaging device, 10, 17 . . . Illumination unit, 20 . . . Optical system, 31 to 39, 50 . . . Detection unit, 40, 42, 49 . . . Analysis unit, 90 . . . Object.

The invention claimed is:

1. An imaging device comprising:
an illumination unit irradiating a moving object with light;
a detection unit having a light receiving plane on which an image of the object irradiated with the light by the illumination unit is formed; and
an analysis unit analyzing a detected result by the detection unit, to obtain an image of the object, wherein
the detection unit includes a one-dimensional line sensor having a plurality of light receiving cells which are arrayed in a first direction on the light receiving plane, and is disposed such that the image moves in a second direction perpendicular to the first direction on the light receiving plane,
the detection unit receives light or does not receive light according to pseudo noise code sequences along the second direction respectively on the plurality of light receiving cells by using a mask having a fixed mask pattern according to the pseudo noise code sequences, to output electric signals corresponding to the respective amounts of light received on the plurality of light receiving cells,
wherein the mask pattern remains fixed for a plurality of images, the analysis unit analyzes the electric signals output respectively from the plurality of light receiving cells of the detection unit, to obtain an image of the object,
the detection unit includes the mask having the fixed mask pattern which is disposed on the light receiving plane, to transmit or block light according to the pseudo noise code sequences along the second direction, and
the imaging device further comprises an optical system that focuses into an image of the object on the mask in the detection unit.

2. The imaging device according to claim 1, wherein the analysis unit analyzes a signal corresponding to a temporal differentiation of the electric signal output from the detection unit, to obtain an edge enhanced image of the image of the object.

3. The imaging device according to claim 1, wherein the analysis unit selectively obtains the image of the object in the background on the basis of an electric signal output from the detection unit when the object is moving in a background, and an electric signal output from the detection unit when there is no object in the background.

4. The imaging device according to claim 1, wherein
in the detection unit, the pseudo noise code sequences respectively on the plurality of light receiving cells are different from one another, and
the analysis unit analyzes an electric signal sampled every time an output value from one of the plurality of light receiving cells of the detection unit changes, to obtain the image of the object.

5. The imaging device according to claim 1, wherein the detection unit uses code sequences whose periodic autocorrelation functions all become 0 except for 0 shift, as the pseudo noise code sequences.

6. The imaging device according to claim 1, wherein the detection unit uses code sequences whose aperiodic autocorrelation functions all become 0 except for 0 shift, as the pseudo noise code sequences.

7. The imaging device according to claim 1, wherein the detection unit uses chirp signals in place of the pseudo noise code sequences, and receives light in accordance with a transmissivity distribution based on the chirp signals along the second direction.

8. An imaging device comprising:
an illumination unit that irradiates a moving object with light;
a detection unit having a light receiving plane on which an image of the object irradiated with the light by the illumination unit is formed; and
an analysis unit which analyzes a detected result by the detection unit, to obtain an image of the object, wherein
the detection unit includes a single-pixel sensor having a plurality of light receiving regions which are arrayed in a first direction on the light receiving plane, and is disposed such that the image moves in a second direction perpendicular to the first direction on the light receiving plane,
the detection unit receives light or does not receive light according to pseudo noise code sequences along the second direction respectively on the plurality of light receiving regions by using a mask having a fixed mask pattern according to the pseudo noise code sequences, in which two arbitrary pseudo noise code sequences among the pseudo noise code sequences respectively on the plurality of respective light receiving regions are substantially perpendicular to one another, the detection unit outputs an electric signal corresponding to a total amount of light received on the plurality of light receiving regions, wherein the mask pattern remains fixed for a plurality of images, the analysis unit analyzes the electric signal output from the detection unit, to obtain an image of the object, the detection unit includes the mask having the fixed mask pattern which is disposed on the light receiving plane, to transmit or block light according to the pseudo noise code sequences along the second direction, and the imaging device further comprises an optical system that focuses into an image of the object on the mask in the detection unit.

9. The imaging device according to claim 8, wherein the analysis unit analyzes an electric signal sampled every time an output value of the detection unit changes, to obtain the image of the object.

10. The imaging device according to claim 8, wherein the analysis unit analyzes a signal corresponding to a temporal differentiation of the electric signal output from the detection unit, to obtain an edge enhanced image of the image of the object.

11. The imaging device according to claim 8, wherein the analysis unit selectively obtains the image of the object in the background on the basis of an electric signal output from the detection unit when the object is moving in a background, and an electric signal output from the detection unit when there is no object in the background.

12. The imaging device according to claim 8, wherein the detection unit uses code sequences whose periodic autocorrelation functions all become 0 except for 0 shift, as the pseudo noise code sequences.

13. The imaging device according to claim 8, wherein the detection unit uses code sequences whose aperiodic autocorrelation functions all become 0 except for 0 shift, as the pseudo noise code sequences.

14. The imaging device according to claim 8, wherein the detection unit uses chirp signals in place of the pseudo noise code sequences, and receives light in accordance with a transmissivity distribution based on the chirp signals along the second direction.

15. An imaging device comprising:

an illumination unit irradiating a moving object with light;

a detection unit having a light receiving plane on which an image of the object irradiated with the light by the illumination unit is formed; and an analysis unit analyzing a detected result by the detection unit, to obtain an image of the object, wherein the detection unit includes a one-dimensional line sensor having a plurality of light receiving cells which are arrayed in a first direction on the light receiving plane, and is disposed such that the image moves in a second direction perpendicular to the first direction on the light receiving plane, the detection unit receives light or does not receive light according to pseudo noise code sequences along the second direction respectively on the plurality of light receiving cells by using a mask having a fixed mask pattern according to the pseudo noise code sequences, to output electric signals corresponding to the respective amounts of light received on the plurality of light receiving cells, wherein the mask pattern remains fixed for a plurality of images, the analysis unit analyzes the electric signals output respectively from the plurality of light receiving cells of the detection unit, to obtain an image of the object, the illumination unit includes the mask having the fixed mask pattern, and irradiates the object with light in a lighting pattern corresponding to the pseudo noise code sequences along a direction corresponding to the second direction, and the imaging device further comprises an optical system that focuses into an image of the mask on the light receiving plane of the detection unit.

16. An imaging device comprising:

an illumination unit that irradiates a moving object with light;

a detection unit having a light receiving plane on which an image of the object irradiated with the light by the illumination unit is formed; and an analysis unit which analyzes a detected result by the detection unit, to obtain an image of the object, wherein the detection unit includes a single-pixel sensor having a plurality of light receiving regions which are arrayed in a first direction on the light receiving plane, and is disposed such that the image moves in a second direction perpendicular to the first direction on the light receiving plane, the detection unit receives light or does not receive light according to pseudo noise code sequences along the second direction respectively on the plurality of light receiving regions by using a mask having a fixed mask pattern according to the pseudo noise code sequences, in which two arbitrary pseudo noise code sequences among the pseudo noise code sequences respectively on the plurality of respective light receiving regions are substantially perpendicular to one another, the detection unit outputs an electric signal corresponding to a total amount of light received on the plurality of light receiving regions, wherein the mask pattern remains fixed for a plurality of images, the analysis unit analyzes the electric signal output from the detection unit, to obtain an image of the object, the illumination unit includes the mask having the fixed mask pattern, and irradiates the object with light in a lighting pattern corresponding to the pseudo noise code sequences along a direction corresponding to the second direction, and the imaging device further comprises an optical system that focuses into an image of the mask on the light receiving plane of the detection unit.

* * * * *